(12) United States Patent
Spitaels et al.

(10) Patent No.: US 8,700,747 B2
(45) Date of Patent: Apr. 15, 2014

(54) SYSTEM AND METHOD FOR AUTOMATICALLY ADDRESSING DEVICES IN A MULTI-DROP NETWORK

(75) Inventors: James S. Spitaels, Shrewsbury, MA (US); Vishwas M. Deokar, Acton, MA (US); Namwook Paik, Acton, MA (US); Brian P. Mearns, Somerville, MA (US)

(73) Assignee: Schneider Electric IT Corporation, West Kingston, RI (US)

(*) Notice: Subject to any disclaimer, the term of this patent is extended or adjusted under 35 U.S.C. 154(b) by 275 days.

(21) Appl. No.: 13/089,678

(22) Filed: Apr. 19, 2011

(65) Prior Publication Data
US 2012/0271924 A1    Oct. 25, 2012

(51) Int. Cl.
*G06F 15/16* (2006.01)
(52) U.S. Cl.
USPC ............ 709/220; 709/224; 370/389; 370/392
(58) Field of Classification Search
USPC .................. 709/220, 219, 224; 370/389, 392
See application file for complete search history.

(56) References Cited

U.S. PATENT DOCUMENTS

| | | | |
|---|---|---|---|
| 4,506,324 A | 3/1985 | Healy | |
| 5,142,528 A | 8/1992 | Kobayashi et al. | |
| 5,323,149 A | 6/1994 | Hoult et al. | |
| 5,361,260 A | 11/1994 | Mito | |
| 5,745,699 A | 4/1998 | Lynn et al. | |
| 5,968,136 A | 10/1999 | Saulpaugh et al. | |
| 7,003,676 B1 | 2/2006 | Weber et al. | |
| 7,054,332 B2 | 5/2006 | Favichia et al. | |
| 7,111,050 B2 | 9/2006 | McAdams | |
| 7,796,589 B2 | 9/2010 | Cohen et al. | |
| 8,102,799 B2 * | 1/2012 | Alexander et al. | 370/328 |
| 8,316,136 B2 * | 11/2012 | Hughes et al. | 709/227 |
| 2003/0126442 A1 | 7/2003 | Glew et al. | |
| 2003/0133574 A1 | 7/2003 | Caronni et al. | |
| 2004/0059815 A1 * | 3/2004 | Buckingham et al. | 709/224 |
| 2004/0088541 A1 | 5/2004 | Messerges et al. | |

(Continued)

FOREIGN PATENT DOCUMENTS

| | | |
|---|---|---|
| EP | 1124351 A2 | 8/2001 |
| EP | 2 287 689 A1 | 2/2011 |

OTHER PUBLICATIONS

International Search Report for PCT/US2012/034115 mailed Jul. 17, 2012.

(Continued)

*Primary Examiner* — Yves Dalencourt
*Assistant Examiner* — Uzma Alam
(74) *Attorney, Agent, or Firm* — Lando & Anastasi, LLP

(57) ABSTRACT

Systems and methods that automatically assign addresses to devices coupled to a shared bus are provided. In one example, a system for assigning addresses to a plurality of devices within a network includes a memory and at least one processor coupled to the memory. The system is configured to instruct all of the plurality of devices to respectively select a first dynamic address from a first set of dynamic addresses, respectively assign a different static address to each device having a first dynamic address that uniquely identifies the device, instruct all of the plurality of devices having a first dynamic address that identifies at least two devices to respectively select a second dynamic address from a second set of dynamic addresses and respectively assign another different static address to each device having a second dynamic address that uniquely identifies the device.

24 Claims, 13 Drawing Sheets

(56) References Cited

U.S. PATENT DOCUMENTS

| | | | |
|---|---|---|---|
| 2005/0071444 A1 | 3/2005 | Motoyama | |
| 2005/0071568 A1 | 3/2005 | Yamamoto et al. | |
| 2005/0262238 A1* | 11/2005 | Reeves et al. | 709/224 |
| 2006/0235997 A1* | 10/2006 | Munirajan et al. | 709/245 |
| 2007/0002833 A1* | 1/2007 | Bajic | 370/352 |
| 2007/0025347 A1 | 2/2007 | Cohen et al. | |
| 2007/0028104 A1 | 2/2007 | Cohen et al. | |
| 2007/0064718 A1 | 3/2007 | Ekl et al. | |
| 2007/0189207 A1 | 8/2007 | Sammour et al. | |
| 2008/0025216 A1 | 1/2008 | Singh et al. | |
| 2008/0031177 A1 | 2/2008 | Lee et al. | |
| 2008/0120370 A1* | 5/2008 | Chan et al. | 709/204 |
| 2009/0092133 A1* | 4/2009 | Mok et al. | 370/389 |
| 2009/0144471 A1 | 6/2009 | Lin | |
| 2009/0287815 A1* | 11/2009 | Robbins et al. | 709/224 |
| 2010/0124189 A1 | 5/2010 | Guguen et al. | |
| 2010/0274945 A1 | 10/2010 | Westrick, Jr. et al. | |
| 2011/0054644 A1 | 3/2011 | Baek et al. | |
| 2011/0291488 A1 | 12/2011 | Paik et al. | |
| 2012/0182994 A1* | 7/2012 | Dec et al. | 370/392 |

OTHER PUBLICATIONS

International Search Report for PCT/US2012/034117 mailed Jul. 20, 2012.

Moyer et al., "A Protocol for Wide-Area Secure Networked Appliance Communication", Internet Appliances, IEEE Communications Magazine, Oct. 2001, 8 pages.

* cited by examiner

SYSTEM AND METHOD FOR AUTOMATICALLY ADDRESSING DEVICES IN A MULTI-DROP NETWORK

BACKGROUND

1. Technical Field

The technical field relates generally to communication between computerized devices and, more specifically, to systems and methods for addressing devices coupled via a bus.

2. Background Discussion

Some networking standards that employ a shared bus topology have a wide installed base in industrial applications. These networking standards include MODBUS, CAN, $I^2C$ and many radio based networks such as WLAN, ZigBee and Bluetooth. There are sundry reasons for the success of these networks, and some include ease of implementation, low cost of materials and robust performance in noisy, industrial settings. Of these standards, networks implementing the MODBUS are particularly popular.

MODBUS is a byte-based communications protocol in which one device, referred to as a master, drives communication with one or more other devices, referred to as slaves. The specification for MODBUS includes in two parts: an application layer and a physical/link layer. The application layer protocol is a general definition for exchanging data between a master and slaves. Messages from the application layer are encapsulated in frames which are then transmitted across the physical/link layer. There are a number of different physical/link layer protocols defined for MODBUS, including MODBUS over Serial Line.

Modes of communication available according to the MODBUS protocol include broadcasts and transactions. A broadcast is a message transmitted by a master to all of the slaves coupled to a network including the master. Under a standard MODBUS implementation, slaves do not respond to broadcasts. Broadcasts can be used to send data from the master to all of the slaves.

In contrast, transactions are initiated by a request message that is unicast from the master to a single slave. Transactions are completed by a response message that is sent from the slave back to the master. Transactions can be used to send data from the master to a specific slave and to receive an acknowledgement at the master, or to retrieve data from a slave.

Devices that communicate via a shared bus topology are assigned addresses through a variety of methods. According to some methods, a person sets the address of a device by manually manipulating an element of the device, such as a dip switch. In other methods, a person configures the address of a device via a software application that stores the address within a memory located in the device. When configuring devices that communicate using a MODBUS protocol, such as MODBUS over Serial Line protocol, addresses are often configured during manufacture of the device or during its initial installation.

MODBUS over Serial Line is typically implemented on a RS-485 bus, and all of the devices coupled to the RS-485 bus may detect messages transmitted through the bus. MODBUS over Serial Line, therefore, uses addresses to uniquely identify each slave in the system. For transactions, the address of the slave targeted for a unicast is included in the outgoing message and specifies which slave should receive, process and respond to the message. For broadcasts, a special reserved address is included in the outgoing message which identifies it as a broadcast to be received and processed by all of the slaves.

SUMMARY

Aspects and examples disclosed herein present systems and processes that assign communications addresses to one or more unaddressed devices connected to a network configured in a shared bus topology. According to some examples, the address assignment process is conducted automatically by a controller that is in communication with the unaddressed devices via a shared, multi-drop bus. In these examples, the controller conducts both broadcast communications and discrete, point to point transactions with the unaddressed devices. Within the transactions, the controller provides addresses that uniquely identify unaddressed devices within the network. Further, in these examples, the unaddressed devices store the provided addresses in memory and configure themselves to recognize their addresses during network communications. Thus, aspects and examples disclosed herein ease the administrative burden associated with configuring devices for network communication and allow devices to be installed without specialized knowledge of address configuration procedures.

According to one example, the controller communicates with the unaddressed devices via a shared RS-485 communications bus. In this example, each device has a unique identifier that is generically referred to as a serial number. The cardinality of the set of serial numbers may be larger that the cardinality of the set of identifiers from which the addresses are generated. This example is based on the MODBUS over Serial Line communications protocol, although it is not strictly compliant with this protocol as it requires multiple devices to respond to the same request. However, since MODBUS over Serial Line does not specify any carrier-sense mechanism (i.e., a mechanism by which a host monitors the bus as it writes to it in order to detect collisions), each device may individually follow the MODBUS protocol. Therefore existing MODBUS implementations may employ this example to automatically generate device addresses.

According to another example, a system for assigning addresses to a plurality of devices within a network is provided. The system includes a memory and at least one processor coupled to the memory and is configured to instruct all of the plurality of devices to respectively select a first dynamic address from a first set of dynamic addresses, respectively assign a different static address to each device having a first dynamic address that uniquely identifies the device, instruct all of the plurality of devices having a first dynamic address that identifies at least two devices to respectively select a second dynamic address from a second set of dynamic addresses and respectively assign another different static address to each device having a second dynamic address that uniquely identifies the device.

The system may be configured to instruct all of the plurality of devices to respectively select a first dynamic address by, at least in part providing an indication of a first address of the first set of dynamic addresses to all of the plurality of devices and providing an indication of a last address of the first set of dynamic addresses to all of the plurality of devices. In the system, the first set of dynamic addresses may have a cardinality different from a cardinality of the second set of dynamic addresses. In addition, the system may be further configured to respectively receive confirmations from each device having a first dynamic address that uniquely identifies the device. Further, the system may be further configured to respectively request an identifier from each device using the first dynamic address selected by the device and respectively receive the identifier from each device having a first dynamic address that uniquely identifies the device, wherein the system is configured to respectively assign a different static address to each device having a first dynamic address that uniquely identifies the device responsive to receipt of the identifier of the device. The identifier may include at least one of a serial number, a microprocessor identifier, a number generated from a random number generator and a number generated from a true random number generator. Moreover, the system may be further configured to respectively request an identifier from each device using the second dynamic address selected by the device and responsive to receiving no identifiers, discontinue assigning addresses.

According to another example, a computer-implemented method of assigning addresses to a plurality of devices using a computer is provided. The computer includes a memory and at least one processor coupled to the memory. The method includes acts of instructing, by the computer via a network, all of the plurality of devices to respectively select a first dynamic address from a first set of dynamic addresses, respectively assigning a different static address to each device having a first dynamic address that uniquely identifies the device, instructing all of the plurality of devices having a first dynamic address that identifies at least two devices to respectively select a second dynamic address from the a second set of dynamic addresses and respectively assigning another different static address to each device having a second dynamic address that uniquely identifies the device.

In the method, the act of instructing, by the computer, all of the plurality of devices to respectively select a first dynamic address may include acts of providing an indication of a first address of the first set of dynamic addresses to all of the plurality of devices and providing an indication of a last address of the first set of dynamic addresses to all of the plurality of devices. In addition, the act of instructing each device having a first dynamic address that identifies at least two devices to respectively select a second dynamic address may include instructing each device to select from a second set of dynamic addresses having a cardinality different from a cardinality of the first set of dynamic addresses.

The method may further include an act of respectively receiving confirmations from each device having a first dynamic address that uniquely identifies the device. In addition, the method may also include acts of respectively requesting an identifier from each device using the first dynamic address selected by the device and respectively receiving the identifier from each device having a first dynamic address that uniquely identifies the device, wherein the act of respectively assigning a different static address to each device having a first dynamic address that uniquely identifies the device is responsive to receipt of the identifier of the device. Moreover, the act of respectively receiving the identifier may include receiving at least one of a serial number, a microprocessor identifier, a number generated from a random number generator and a number generated from a true random number generator. Furthermore, the method may further include acts of respectively requesting an identifier from each device using the second dynamic address selected by the device and responsive to receiving no identifiers, discontinuing assigning addresses.

According to another example, a non-transitory computer readable medium is provided. The computer readable medium has stored thereon sequences of instruction for assigning addresses to a plurality of devices within a network. These instructions include instructions that will cause at least one processor to instruct all of the plurality of devices to respectively select a first dynamic address from a first set of dynamic addresses, respectively assign a different static address to each device having a first dynamic address that uniquely identifies the device, instruct all of the plurality of devices having a first dynamic address that identifies at least two devices to respectively select a second dynamic address from the a second set of dynamic addresses and respectively assign another different static address to each device having a second dynamic address that uniquely identifies the device.

The sequences of instruction may include instructions that will cause the at least one processor to instruct all of the plurality of devices having a first dynamic address that identifies at least two devices to respectively select a second dynamic address by instructing all of the plurality of devices having a first dynamic address that identifies at least two devices to select from a second set of dynamic addresses having a cardinality different from a cardinality of the first set of dynamic addresses. Further, the sequences of instruction may include instructions that will further cause the at least one processor to respectively receive confirmations from each device having a first dynamic address that uniquely identifies the device. Moreover, the sequences of instruction may include instructions that will further cause the at least one processor to respectively request an identifier from each device using the first dynamic address selected by the device and respectively receive the identifier from each device having a first dynamic address that uniquely identifies the device, wherein the act of respectively assigning a different static address to each device having a first dynamic address that uniquely identifies the device is responsive to receipt of the identifier of the device. In addition, the sequences of instruction may include instructions that will further cause the at least one processor to respectively receive the identifier by receiving at least one of a serial number, a microprocessor identifier, a number generated from a random number generator and a number generated from a true random number generator. Furthermore, the sequences of instruction may include instructions that will further cause the at least one processor to respectively requesting an identifier from each device using the second dynamic address selected by the device and responsive to receiving no identifiers, discontinuing assigning addresses.

According to another example, a system for assigning addresses to a plurality of devices within a network is provided. The system includes a first device configured to issue a first instruction to all of the plurality of devices, the first instruction requesting that each of the plurality of devices respectively select a first dynamic address from a first set of dynamic addresses, receive at least one first response from any of a first subset of the plurality of devices having a first dynamic address that uniquely identifies the device and respectively issue a first assignment of a first different static address to each device of the first subset. In the system, each of the plurality of devices is configured to receive the first instruction from the first device, select the first dynamic address responsive to receiving of the first instruction, issue, to the first device, a first response to the first instruction, receive, from the first device, the first assignment of the first different static address and store the first different static address as a communications address.

In the system, the first device may be further configured to issue a second instruction to all of the plurality of devices, the second instruction requesting that each of the plurality of devices not belonging to the first subset respectively select a second dynamic address from a second set of dynamic addresses, receive at least one second response from any of a second subset of the plurality of devices, each of the second subset having a second dynamic address that uniquely identifies the device and respectively issue a second assignment of a second different static address to each device of the second subset. Moreover, in the system each of the plurality of devices may be further configured to receive the second instruction from the first device, select the second dynamic address responsive to receiving of the second instruction, issue, to the first device, a second response to the second instruction, receive, from the first device, the second assignment of the second different static address and store the second different static address as a communications address. In addition, each of the plurality of devices may be configured to randomly select the first dynamic address. Further, each of the plurality of devices is configured to respond to the first instruction with a unique identifier. Also, the unique identifier may be based on at least one of a serial number, a microprocessor identifier, a number generated from a random number generator and a number generated from a true random number generator.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
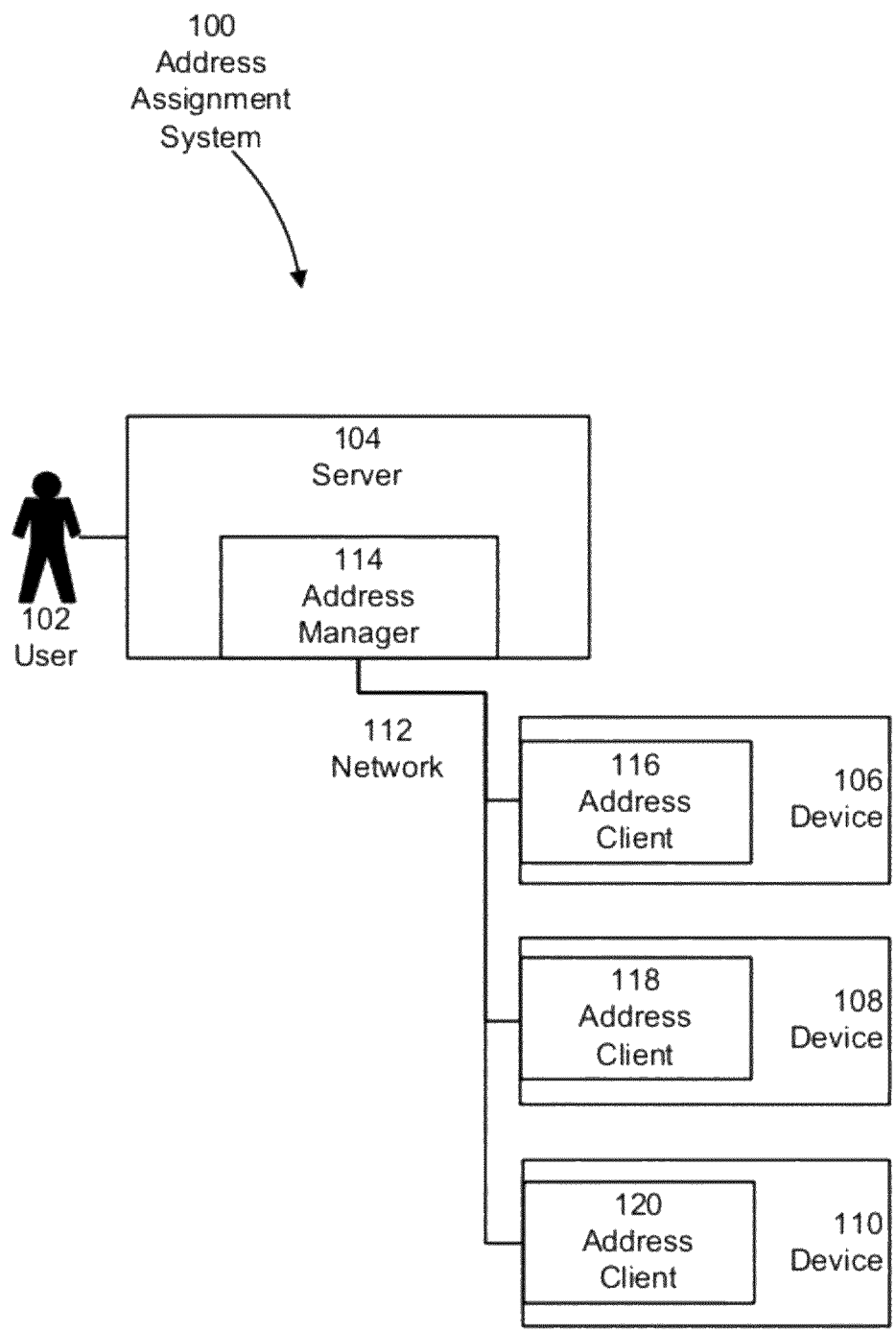
FIG. 1 is a functional schematic of one example of an address assignment system.

In at least one example, an address source device coupled to one or more address target devices via a shared bus network implements an interface through which the source device receives an indication to initiate an address assignment process. The interface includes hardware and software configured to receive the indication from an external entity, such as a user or an external system. Upon receipt of the indication, the interface executes the address assignment process. The address assignment process assigns unique addresses to the target devices from a predefined set of addresses, referred to as an "address space," that are compatible with the communication protocol utilized by the shared bus network.

In some examples, the address assignment process divides the address space into two regions: a static region and a dynamic region. For normal communications, target devices will each have a unique address in the static region. For communications initiated by the address assignment process, target devices each have an address in the dynamic region, as discussed below, the dynamic address of each target device may or may not be unique.

According to some examples directed to a network employing the MODBUS protocol, the address assignment process is triggered by a user through a user interface. According to these examples, once triggered, the address assignment process begins with a broadcast message from the master, instructing all slaves to configure themselves to use a communications address from the dynamic region. To implement this instruction, each slave will abandon its current static address, generate a random (or pseudo random) address from the dynamic region and configure itself to communicate using this generated, dynamic address. The set of all slaves with an address in the dynamic region is referred to herein as the "dynamic pool."

Various examples use a variety of random number generators to generate random numbers. For instance, according to one example, an autonomous linear feedback shift register (ALFSR), which is an algorithm based on Galois finite fields, is used. In this example, the state of an ALFSR is buffered on each iteration, and bits are drawn sequentially from the buffer as needed for multiple outputs of the pseudo-random number generator. Further, in this example, the ALFSR is not iterated again until the buffer is empty. This procedure helps increase the "randomness" of the ALFSR based pseudo-random number generator.

In one example, the address assignment process proceeds with one or more rounds. The goal of each round is to find slaves in the dynamic region, determine their serial number, and move them to the static region by assigning them an address from the static region. Once a slave is moved into the static region, it is removed from the dynamic pool and no longer participates in this instance of the address assignment process. However, it is to be appreciated that another instance of the address assignment process may be initiated, at which point a broadcast message from the master will instruct all slaves to move back to the dynamic pool.

Continuing this example, each round of the address assignment process proceeds as follows. The master iterates through every address in the dynamic region. For each dynamic address, the master selects the dynamic address and unicasts a transaction request message to the selected dynamic address. Any slave that has chosen the selected dynamic address responds with the value of their serial number. If the master receives no response to the transaction request message, the master determines that no slave has adopted the selected dynamic address.

If the master receives a "garbled" response (for example, the response fails a CRC validity check), the master determines that two or more slaves have adopted the selected dynamic address. This determination is made because a garbled response is indicative of a collision generated by two or more slaves communicating on the shared bus at the same time. Since, in this instance, more than one slave has adopted the selected dynamic address, the master cannot effectively unicast to a single slave to assign a static address. All colliding slaves will, therefore, remain in the dynamic pool. The master will attempt to clear the colliding slaves from the dynamic pool in a subsequent round.

If the master receives a valid response (for example, the response passes the CRC validity check), the master unicasts back a message to the selected dynamic address. The message assigns a static address to the slave, and the slave acknowledges the assignment. The slave is now removed from the dynamic pool and need not participate in the subsequent rounds of the address assignment process.

Once the master iterated through all the dynamic addresses, the round is over. If there were any collisions during the round, then there are still slaves in the dynamic pool and another round is required. To start another round, the master sends another broadcast message instructing all slaves in the dynamic pool to choose another random address in the dynamic region. This will tend to distribute colliding slaves to other addresses so they no longer collide. Assuming that at least one slave was cleared from the dynamic pool in the last round, the odds of collisions occurring will be reduced in subsequent rounds. Over a series of rounds, it can be expected that the probability of collision will tend towards zero, thus allowing all slaves to be cleared from the dynamic pool and by being assigned a static address.

This example of the address assignment process ends when there are no slaves left in the dynamic pool. The master determines that this is the case if the master did not receive any responses (garbled or otherwise) for a full round (i.e., from any dynamic address). In other examples, the master may determine that the dynamic pool is empty once the master executes a round in which the master received no garbled responses. Lack of any garbled responses may indicate that there were no collisions and, therefore, all slaves that were in the dynamic pool during the round have been removed from the dynamic pool. However, under certain circumstances, it is possible that a valid message was received and static address assigned despite a collision. This circumstance will be discussed below.

This example manifests an appreciation that, while some communications protocols, such as the Internet Protocol, allow unaddressed devices to request a communication address, other communications protocols, such as MODBUS, do not. Therefore an address assignment protocol that requires slaves to initiate address assignments with a server, such as DHCP, cannot be used on a MODBUS network because slaves cannot initiate a transaction to announce their presence on the bus. Furthermore, this example reflects an understanding that serial numbers typically cannot be used as MODBUS addresses because the MODBUS address space is smaller than an address space made up of potential serial numbers under most serial number assignment schemes.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Address Assignment System

Various examples disclosed herein implement an address assignment system on one or more computer systems. FIG. 1 illustrates one of these examples, an address assignment system 100. As shown, the address assignment system 100 includes a user 102 and a server 104 coupled to devices 106, 108 and 110 via a network 112. In the illustrated example, the server 104 is implemented using a computer system, such as the computer systems discussed further below with reference to FIG. 2. In some examples, the devices 106, 108 and 110 are also computer systems. As shown, the server 104 includes an address manager 114 and the devices 106, 108 and 110 include address clients 116, 118 and 120, respectively.

In other examples, the devices 106, 108 and 110 include computing resources, but primarily function as devices other than computer systems. For instance, in these examples, the devices 106, 108 and 110 may be uninterruptible power supplies, current transformers or smart batteries, and wireless ZigBee devices, among others. Thus, in these examples, the computing resources included in the devices 106, 108 and 110 are limited and are tailored to support the operation of the devices.

The network 112 may include any communication network through which a computer system may send or provide information. For example, the network 112 may be a public network, such as the internet, and may include other public or private networks such as LANs, WANs, extranets and intranets. In some examples, the network 112 utilizes a shared network bus and employs standards that are well suited for industrial or residential applications. Some of these networking standards include communication protocols such as C-BUS™ and TCP/IP over Ethernet, serial protocols, such as MODBUS ASCII/RTU, MODBUS over Serial Line, DMX512 and JCI-N2. In other examples, the network 112 utilizes a wireless bus and implements wireless protocols, such as ZigBee and Bluetooth. For instance, according to one example, the servers 104 and the devices 106, 108 and 110 are respectively a master CT module and slave CT modules that communicate via a wireless bus such as the master CT module 502 and the slave CT modules 504 as described with reference to FIG. 5 in co-pending U.S. patent application Ser. No. 12/789,922, entitled SYSTEM FOR SELF-POWERED, WIRELESS MONITORING OF ELECTRICAL CURRENT, POWER AND ENERGY, filed May 28, 2010, which is incorporated by reference herein in its entirety. Further, in at least one example, the network 112 includes a half-duplex medium that allows for only one device to issue messages within a given period of time. Further, according to this example, the network 112 does not include collision detection and avoidance facilities.

As shown, the server 104 is employed by a user 102 to assign addresses to the devices 106, 108 and 110 via the network 112. In particular, a user interface component resident on the server 104 provides a user interface through which the address manager 114 receives address assignment requests from the user 102. In various examples, the address assignment requests include information required to execute a variety of automatic address assignment processes, which are described further below with reference to FIGS. 3-11. Depending on the particular automatic address assignment processes requested, the required information may include information indicating devices targeted for automatic address assignment, a set of addresses belonging to a temporary address space to be used to assign operating addresses to the target devices and a set of addresses belonging to an operating address space to be used by the target devices during normal operation. Within some examples, the temporary address space is referred to as a "dynamic address space" and the operating address space is referred to as a "static address space." In at least one example, this user interface component is included in the address manager 114.

The address manager 114 processes address assignment requests by conducting one or more automatic address assignment processes. More particularly, in some examples, the address manager 114 implements a system interface through which the address manager exchanges and processes configuration messages with the address clients 116, 118 and 120. Particular examples of the automatic address assignment processes conducted by the address manager 114 are described further below with reference to FIGS. 3-11.

In another example, an intermediate device is located within the network 112 and in-between the server 104 and the devices 106, 108 and 110. According to this example, the user interface component is not included in the address manager 114. Rather, according to this example, the user interface component is a stand-alone component resident on the server 104 and the address manager 114 is resident on the intermediate device. Further, according to this example, the server 104 provides the address assignment requests to the address manager 114 and, as discussed above, the address manager 114 provides address information to the target devices.

With continued reference to the example of FIG. 1, the address clients 116, 118 and 120 each automatically configure communication addresses for the devices 106, 108 and 110, respectively. More particularly, the address clients 116, 118 and 120 each implement a system interface through which each address client exchanges and processes configuration messages from the address manager 114. The specific communication messages exchanged and processed vary depending on the automatic address assignment process being conducted by the address manager 114. At least one exemplary process conducted by each of the address clients 116, 118 and 120 is discussed further below with regard to FIGS. 3-11.

Information may flow between these components, or any of the elements, components and subsystems disclosed herein, using a variety of techniques. Such techniques include, for example, passing the information over a network using standards protocols, such as MODBUS, passing the information between modules in memory and passing the information by writing to a file, database, data store, or some other non-volatile data store device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

In addition, examples of the address assignment system 100 may include a variety of hardware and software components configured to perform the processes and functions described herein, and examples are not limited to a particular hardware component, software component or combination thereof. For instance, according to some examples, the address assignment system 100 is implemented using a distributed computer system. An example of one such distributed computer system is discussed further below with regard to FIG. 2.

Information, including address information within address assignment requests and responses, may be stored on the server 104 or the device 106, 108 and 110 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The interfaces disclosed herein, which include both system interfaces and user interfaces, exchange (i.e. provide or receive) information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the address assignment system 100 or unauthorized access to the address assignment system 100.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones, personal digital assistants, tablet computers and laptop computers, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects, processes and functions may be implemented within methods, acts, systems, system elements and components using a variety of hardware and software configurations, and examples are not limited to any particular distributed architecture, network, or communication protocol.

Figure 2:
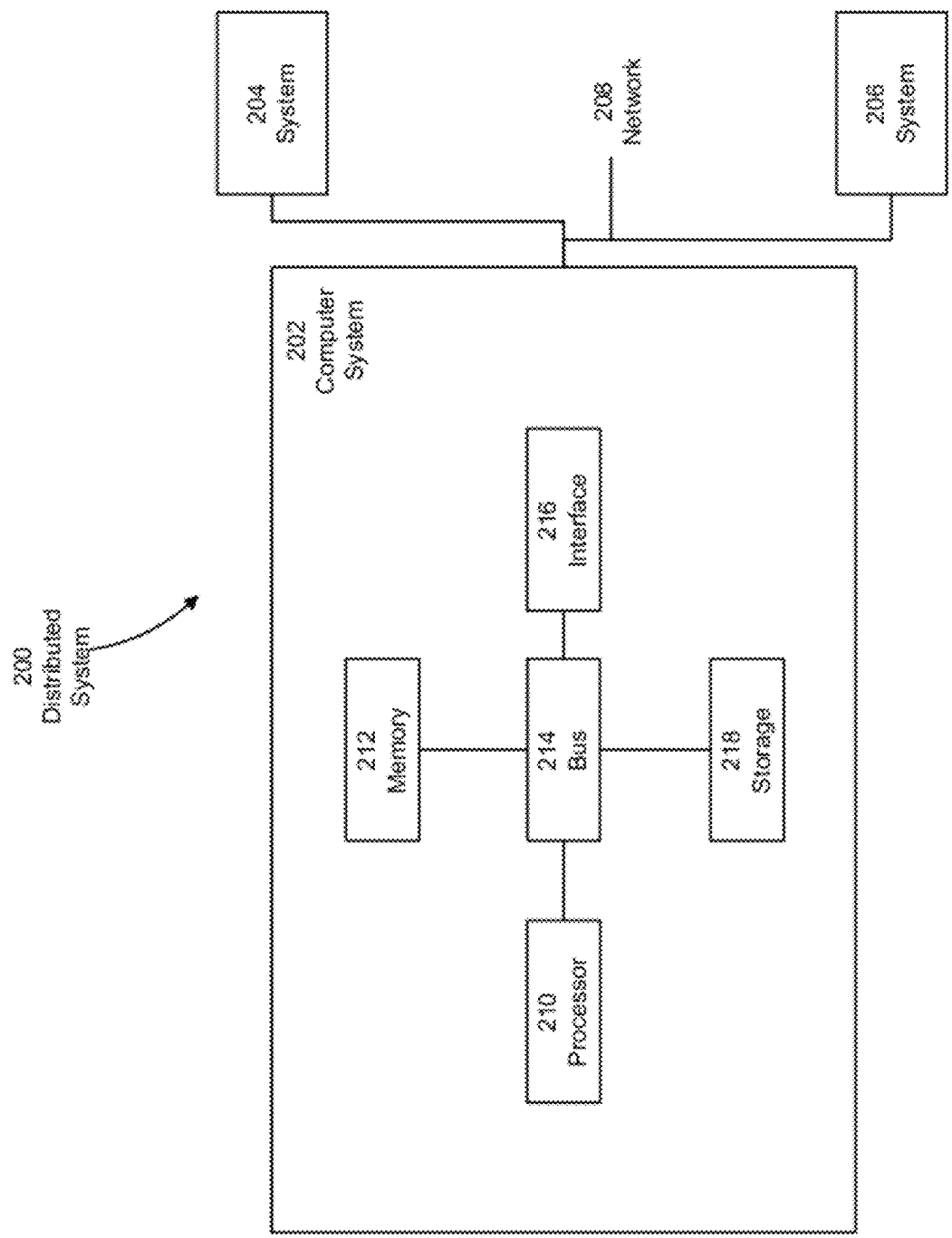
FIG. 2 is a functional schematic of one example of a computer system that may perform processes and functions disclosed herein.

Referring to FIG. 2, there is illustrated a functional schematic of a distributed computer system 200 in which various aspects and functions are practiced. As shown, the distributed computer system 200 includes one more computer systems that exchange information. More specifically, the distributed computer system 200 includes computer systems 202, 204 and 206. As shown, the computer systems 202, 204 and 206 are interconnected by, and may exchange data through, a communication network 208. The network 208 may include any communication network through which computer systems may exchange data. To exchange data using the network 208, the computer systems 202, 204 and 206 and the network 208 may use various methods, protocols and standards, including, among others, RS-485, RS422, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TLS, SSL or VPN. While the distributed computer system 200 illustrates three networked computer systems, the distributed computer system 200 is not so limited and may include any number of computer systems and computing devices, networked using any medium and communication protocol.

FIG. 2 illustrates a particular example of a distributed computer system 200 that includes computer system 202, 204 and 206. As illustrated in FIG. 2, the computer system 202 includes a processor 210, a memory 212, a bus 214, an interface 216 and data storage 218. To implement at least some of the aspects, functions and processes disclosed herein, the processor 210 performs a series of instructions that result in manipulated data. The processor 210 may be any type of processor, multiprocessor, controller or microcontroller. Some exemplary processors include commercially available processors such as a Stellaris ARM Cortex-M3, Intel Xeon, Itanium, Core, Celeron, Pentium, AMD Opteron, Sun UltraSPARC, IBM Power5+ and IBM mainframe chip. The processor 210 is connected to other system components, including one or more memory devices 212, by the bus 214.

The memory 212 stores programs and data during operation of the computer system 202. Thus, the memory 212 may be a relatively high performance, volatile, random access memory such as a dynamic random access memory (DRAM) or static memory (SRAM). However, the memory 212 may include any device for storing data, such as a disk drive or other non-volatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the bus 214. The bus 214 may include one or more physical busses, for example, busses between components that are integrated within a same machine, but may include any communication coupling between system elements including specialized or standard computing bus technologies such as IDE, SCSI, PCI and InfiniBand. Thus, the bus 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and communicate with external entities, such as users and other systems.

The data storage 218 includes a computer readable and writeable nonvolatile (non-transitory) data storage medium in which instructions are stored that define a program or other object that is executed by the processor 210. The data storage 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage 218. The memory may be located in the data storage 218 or in the memory 212, however, the processor 210 manipulates the data within the memory, and then copies the data to the storage medium associated with the data storage 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include MicroC/OS-II, available from Micrium, Inc., a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Automatic Addressing Processes

Figure 3:
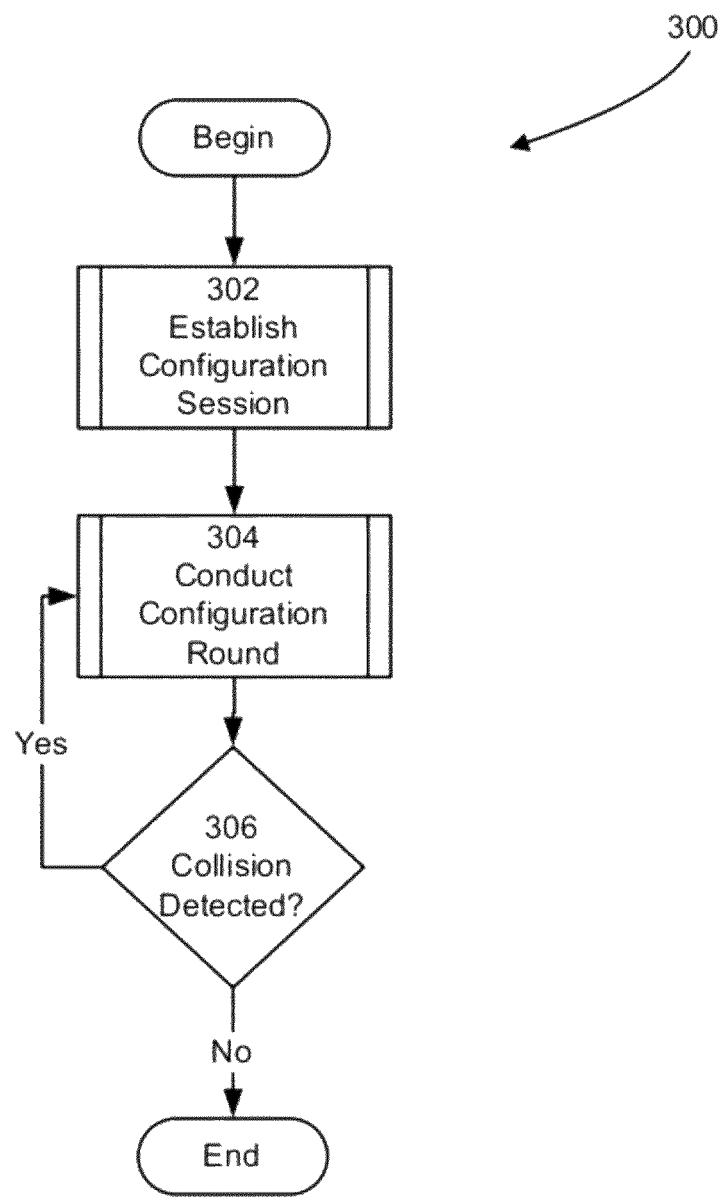
FIG. 3 is a flow diagram depicting a process of automatically assigning addresses to target devices.

As discussed above, some examples perform processes that result in addresses being assigned to one or more devices via a network. More specifically, according to one example, a device, such as the server 104, includes one or more components, such as the address manager 114, that perform a process to assign operating addresses to one or more other devices, such as the devices 106, 108 and 110. FIG. 3 illustrates an example of such a process, process 300. As shown, the process 300 includes acts of establishing a configuration session, conducting a configuration round and determining if any responses were received from devices coupled to the network during the configuration round.

In act 302, a configuration session is established between a source device that controls the address assignment process and one or more target devices coupled to a network. In at least one example, the source and target devices are specified in an address assignment request that is entered by the user 102 or provided by an external system. According to another example, the source device performs particularized initialization and allocation functions that enable the source device to support the address assignment process disclosed herein. In this example, the source device also provides a portion of the information generated during initialization to the target devices. One example of a process performed in the act 302 is discussed further below with reference to FIG. 4.

In act 304, a configuration round is conducted. In some examples, a source device conducts a configuration round by attempting to assign addresses to the target devices. One example of a process performed in the act 304 is explained further below with reference to FIG. 5.

In act 306, it is determined whether any collisions occurred during the configuration round. According to at least one example, the source device makes this determination by analyzing the messages received from the target devices during the communication round. If any collisions are detected, the source device conducts one or more subsequent configurations round by re-establishing the dynamic region, requesting devices remaining in the dynamic pool to re-select an address from the dynamic region and executing the act 304. However, in at least one example, the source device limits the number of configuration rounds executed to a predetermine number to prevent the possibility of a runaway system. If no collisions are detected, the source device terminates the process 300.

In another example, the source device periodically determines whether any target devices remain in the dynamic region and, if not, terminates the process 300. The source device may make this determination by requesting and receiving the serial number of any devices remaining within the dynamic region. Further, in this example, the determination may be triggered by various events, such as the source device having received responses from more than a threshold number of target devices or the source device having searched more than a threshold fraction of the dynamic region. Address assignment processes in accord with the process 300 enable source devices to efficiently and effectively configure target devices with addresses that are used during normal operation of the target devices.

To receive the address assignments provided through execution of the process 300, target devices, such as the devices 106, 108 and 110, include at least one component, such as the address clients 116, 118, 120, that performs a process 700 that is reciprocal to the process 300. One example of the process 700 is illustrated with reference to FIG. 7. As shown, the process 700 includes acts of initializing a configuration session, processing configuration messages and entering a normal operating mode.

In act 702, a configuration session is initialized on the target device. In one example, the target device receives initialization information from the source device, and the target device processes the initialization information to prepare itself to receive operating address information from the source device. One example of a process performed in the act 702 is discussed further below with reference to FIG. 8.

In act 704, configuration messages are processed by the target device. In one example, the target device configures itself to use an assigned operating address by receiving, processing and responding to a variety of configuration messages. One example of a process performed in the act 704 is explained further below with reference to FIG. 9.

In act 706, a normal operating mode is entered. According to at least one example, after establishing a communications address to be used during normal operation, the target device enters a normal operating mode in which it communicates on the networking using the communication address. Address assignment processes in accord with the process 700 enable target devices to be efficiently and effectively configured with addresses that are used during normal operation of the target devices, thereby avoiding the cost and difficulty associated with manual configuration processes.

Source Device Processes

Figure 4:
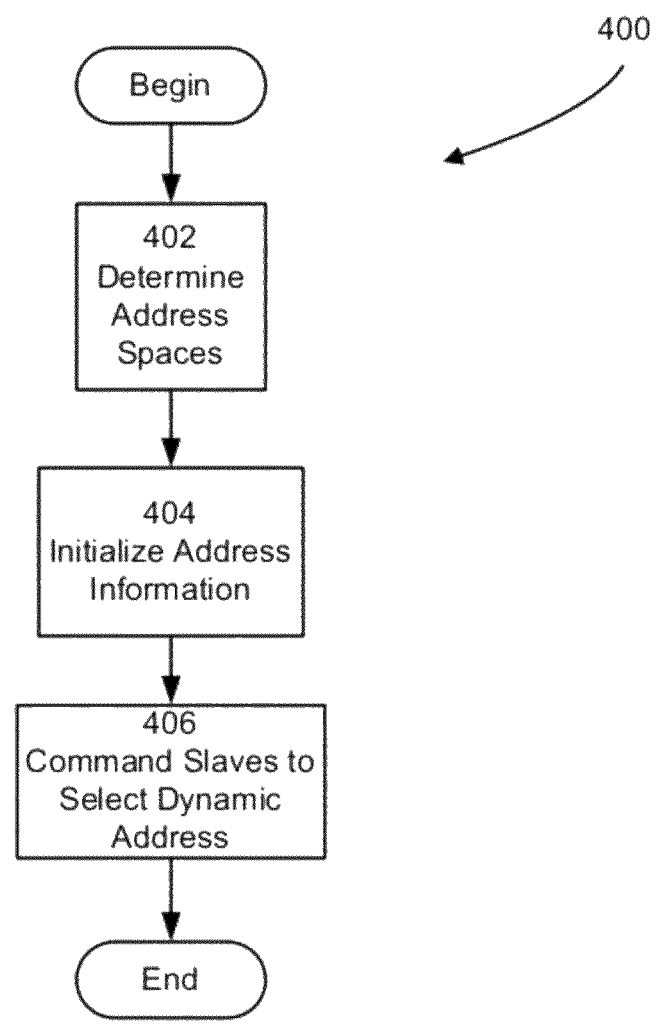
FIG. 4 is a flow diagram illustrating a process of establishing a configuration session.

As discussed above with reference to the act 302 of the process 300, in some examples, a source device, such as the server 104, establishes a configuration session with one or more target devices. FIG. 4 illustrates an exemplary process 400 that may be implemented by the source device to achieve this purpose. As shown, the process 400 includes acts of determining an address space, initializing address information and commanding slaves to select a dynamic address.

In act 402, the source device determines one or more address spaces to be utilized during the automatic address assignment process. According to one example, the source device identifies a set of addresses that may be used to communicate with target devices according to the network protocols employed on a network. Once this address space is identified, the source device divides the address space into a dynamic region and a static region. The number of addresses included in each region will vary based on the number of target devices to be included in the dynamic pool and the total number of static address available. In one example, the number of addresses included in the dynamic region is equal to the number of expected target devices multiplied by a constant, such as 2.

In act 404, the source device initializes one or more elements of address information. Initialization of this information may include allocating variables to store the current static address and the current dynamic address and respectively setting the values these variables to the next static address to be assigned and the next dynamic address to be assigned a static address. Further, this initialization may delete any stored static address information applicable to previously conducted automatic address assignment processes. Next, in act 406, the source device issues an instruction to the target devices requesting that all target devices select a temporary communication address from the dynamic address space. Upon completion of the process 400, the source device is ready to begin automatic assignment of operating addresses to the target devices.

Figure 5:
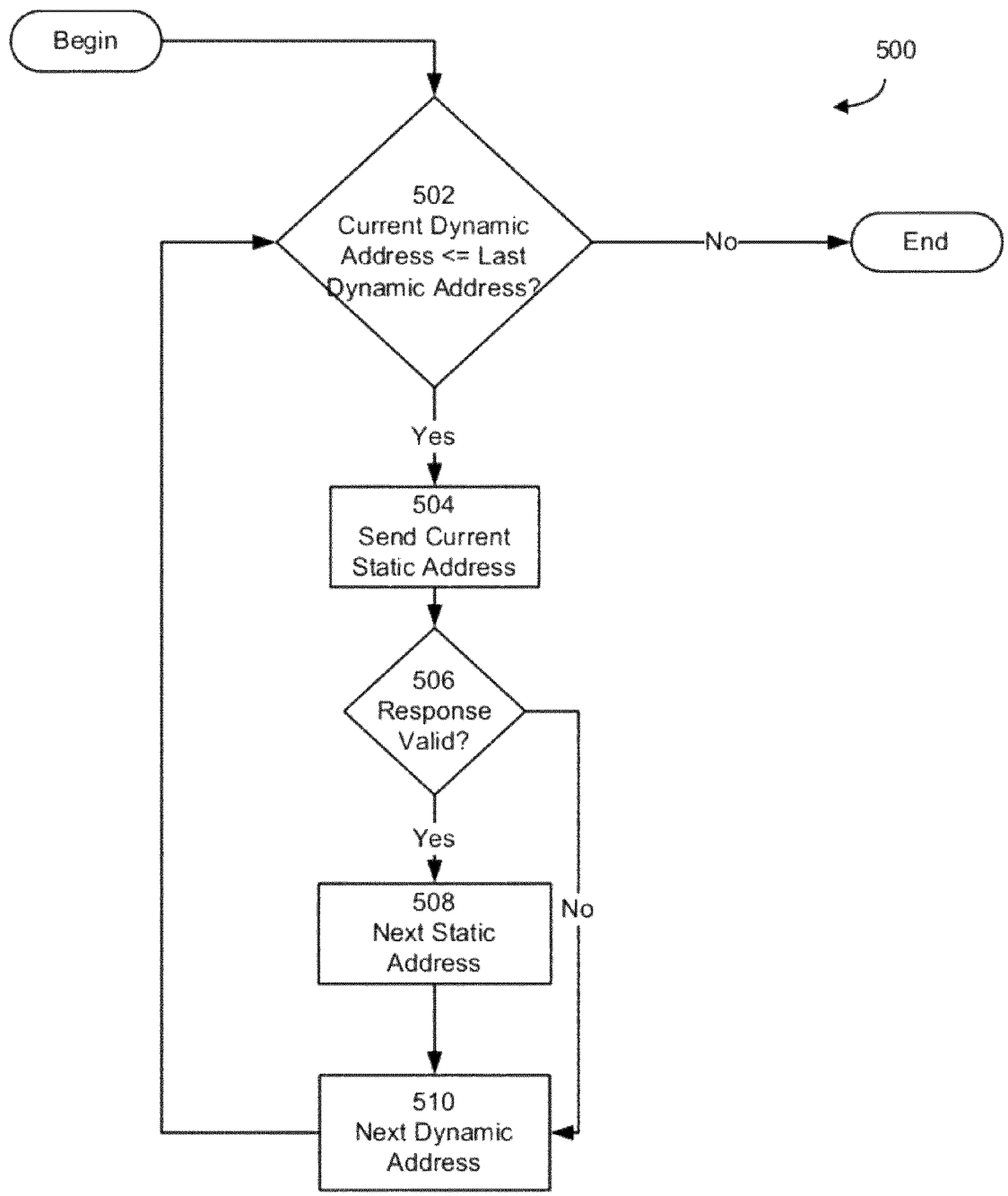
FIG. 5 is a flow diagram illustrating a process of conducting a configuration round.

As discussed above with reference to the act 304 of the process 300, in some examples, a source device, such as the server 104, conducts a configuration round in which the source device assigns operating address to one or more target devices. FIG. 5 illustrates an exemplary process 500 that may be implemented by the source device to achieve this purpose. As shown, the process 500 includes several acts, each of which is discussed further below.

In act 502, the source device determines if the value of the current dynamic address variable is less than or equal to the last dynamic address. If not, the source device terminates the process 500. Otherwise, the source device sends the value of the current static address to any target devices using the current dynamic address in act 504. In act 506, the source device determines if a valid response is received within a predetermined period of time. If not, the source device executes act 510. Otherwise, the source device sets the value of the current static address variable to the next static address within the static address region in act 508. In the act 510, the source device sets the value of the current dynamic address variable to the next dynamic address within the dynamic address region. Upon completion of the process 500, the source device has completed one round of address configuration and has, potentially, assigned operating addresses to one or more target devices.

In some examples, rather than conducting a configuration round by performing a sequential search of the dynamic region as discussed above, the source device may employ an alternative search method. For instance, according to one example, the source device performs a binary search of the dynamic region. According to this example, given a subset of the dynamic region including the addresses N to N+R−1, the source device searches the subset by requesting an identifier, such as a serial number, from any target devices with a communications addresses within the subset, i.e. inclusively between N and N+(R/2)−1. If the source device receives a single response, the source device assigns a unique static address to the responding target device. If the source device receives no response, the source device next searches the other half of the dynamic region by requesting serial numbers of target devices using communication addresses in between N+(R/2), N+R−1. If, however, the source device receives multiple responses to the serial number request targeted to addresses N to N+(R/2)−1 (i.e., a collision exists in the subset) and N to N+(R/2)−1 includes a plurality of addresses, the source device recursively calls another instance of the binary search function with the dynamic address range in which the collision exists, for example N to N+(R/2)−1. This binary search method is recursively repeated until the dynamic region is searched and individual target devices are identified and assigned static addresses or until the portion of the dynamic region that receives multiple responses cannot be further subdivided, i.e. includes only one dynamic address. Using this approach, the source device can quickly eliminate large sections of the dynamic region with a single request.

In a particular example where the source device searches a dynamic region including the addresses 1 to 5 for three target devices: one of which is using dynamic address 4 and two of which are using dynamic address 5, the source device begins by requesting an identifier of any target device having a dynamic address of 1 to 3. Because none of the three target devices uses any of the dynamic addresses 1 to 3, the source device receives no response from the target devices. Next, the source device requests an identifier of any target device having a dynamic address of 4 to 5. Because all three of the target devices are using dynamic addresses in the range of 4 to 5, the source device receives multiple responses. As a result, the source device recursively calls the search function with a dynamic address range of 4 to 5.

Next, the source device requests an identifier of any target device having a dynamic address of 4. Because one of the three target devices uses the dynamic address of 4, the source device receives a single response from that target device. After receiving the single response, the source device assigns a unique static address to the responding target device. The source device then requests an identifier of any target device having a dynamic address of 5. Because two of the three target devices use the dynamic address of 5, the source device receives multiple responses. However, because the dynamic address range of 5 to 5 cannot be further subdivided, the source device terminates this instance of the binary search function. The source device then returns to the previous instance of the binary search function, which terminates because the previous dynamic region of 1 to 5 has been searched. In this example, the source device may attempt to assign the two target devices remaining in the dynamic pool by conducting a subsequent configuration round.

Figure 6:
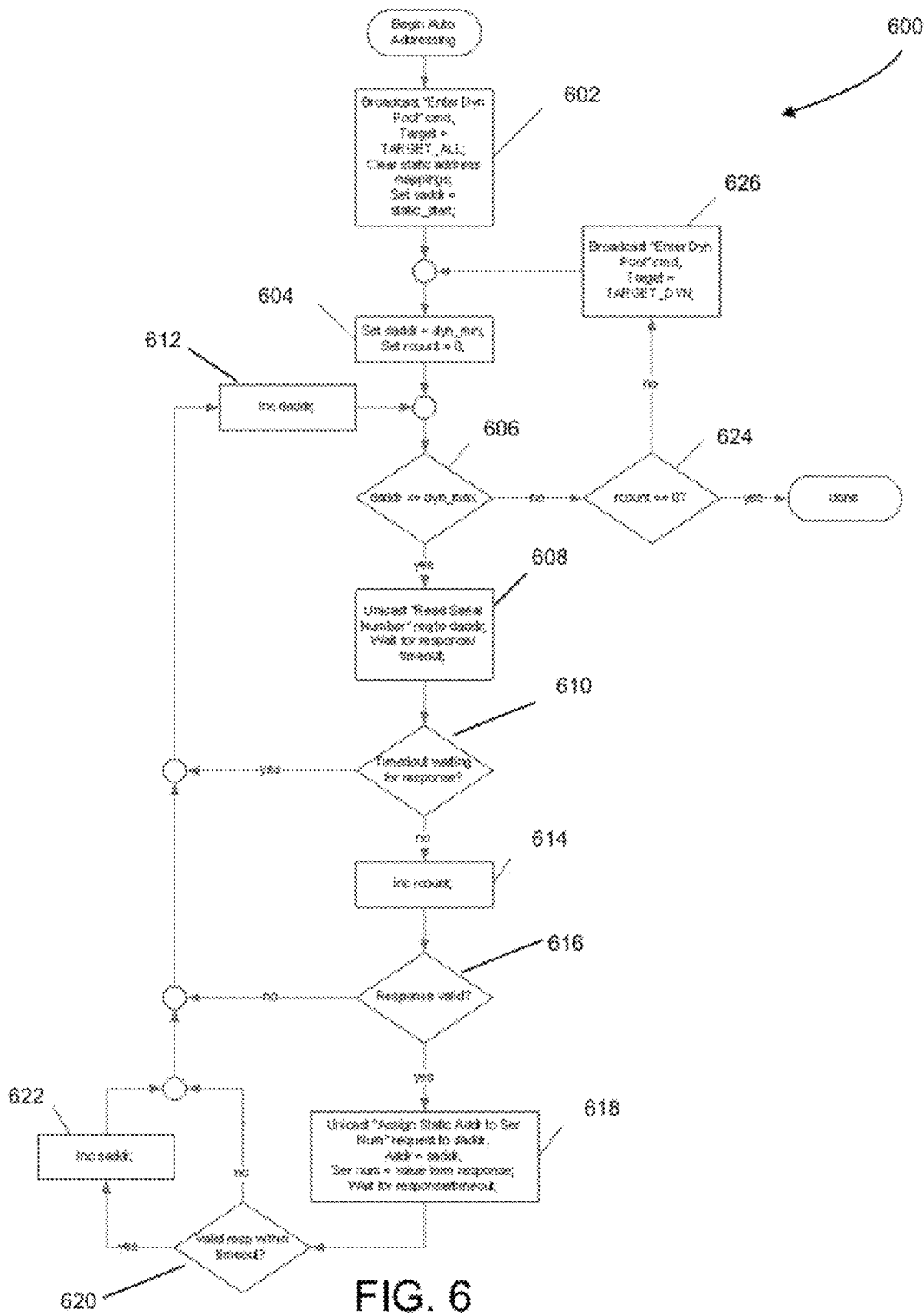
FIG. 6 is a flow diagram illustrating another process of automatically assigning addresses to target devices.
Figure 7:
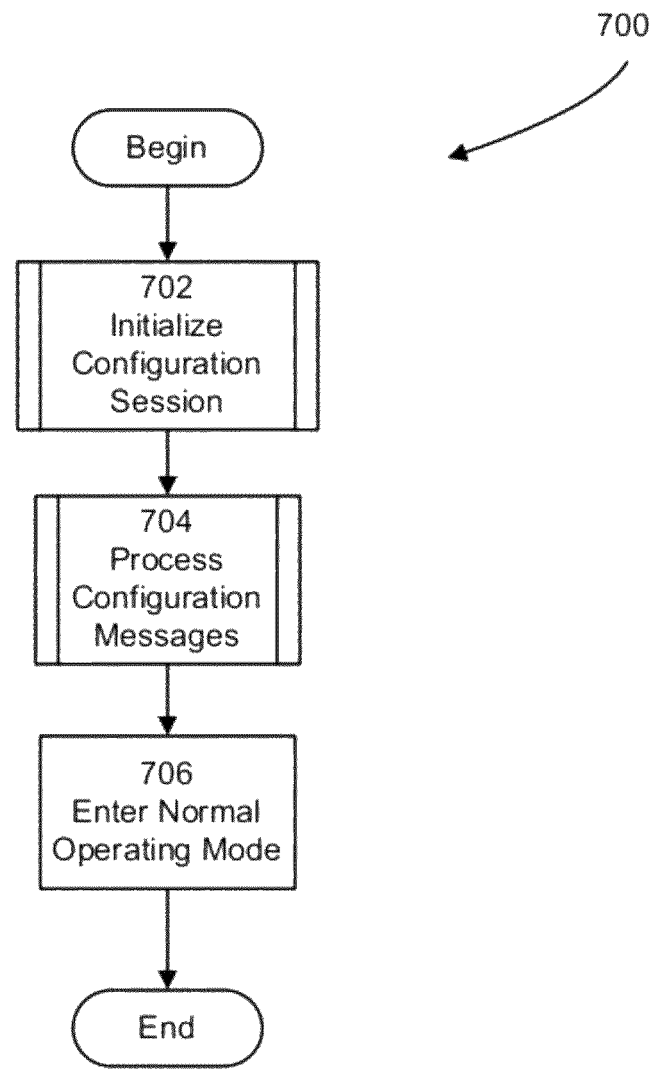
FIG. 7 is a flow diagram depicting a process of configuring a target device to use an assigned address.

FIG. 6 illustrates another example of a process to assign operating addresses to one or more devices within a MODBUS network. According to this example, messages are communicated using the binary RTU MODBUS communication mode at 9600 bps. As shown in FIG. 6, the process 600 begins at act 602 where a master broadcasts an initial "Enter Dynamic Pool" command targeting to all slaves and waits an appropriate amount of time (referred to as the "turn around time" in MODBUS) for the slaves to act on the command before transmitting an additional message. In this example, the turn around time is configured to be about 11 ms. The broadcast message includes a #TARGET_ALL parameter within the command, thereby instructing all slaves on the MODBUS network to enter the dynamic pool. In accordance with the MODBUS application protocol, when executing the act 602, the master includes a "Write Multiple Registers" function within the message communicating the Enter Dynamic Pool command to slaves. The MODBUS register address to which the function is written specifies what command is to be executed, and the register values that are written are the parameters for the command.

In at least one example, the application layer packet embedded in the command message is formatted as shown in Table 1. The message format tables, such as table 1, list each 1-octet field in the message. For clarity, both the MODBUS field name and the field name used by the process 600 is listed. Values for each field are either constant or variable. Constants are listed as literal values within quotation marks when the value is fixed. Constants preceded with a # character and listed without quotation marks are arbitrary constants. Arbitrary constants must be defined identically for all devices participating in the process 600, but no the specific value for the constant is required.

TABLE 1

| Offset | MODBUS Field | Process 600 Field | Value |
| --- | --- | --- | --- |
| 0 | Function code (Write Multiple Registers) | MB Func Code | "0x10" |
| 1 | Reg Addr Hi | CTBus Command Hi | #ENTER_DYN_POOL_HI |
| 2 | Reg Addr Lo | CTBus Command Lo | #ENTER_DYN_POOL_LO |
| 3 | Reg Count Hi | MB Reg Count Hi | "0x00" |
| 4 | Reg Count Lo | MB Reg Count Lo | "0x02" |
| 5 | Byte Count | MB Byte Count | "0x04" |
| 6 | Reg 0 value Hi | Reserved | "0x00" |
| 7 | Reg 0 value Lo | Target Type | Target type |
| 8 | Reg 1 value Hi | Dyn Region Bounds A | Dyn Region Bounds A |
| 9 | Reg 1 value Lo | Dyn Region Bounds B | Dyn Region Bounds B |

In this example, the message specifies a MODBUS register address that indicates the Enter Dynamic Pool command. The Enter Dynamic Pool command always takes 4 octets of parameter data (corresponding to two MODBUS registers, as MODBUS registers are 16 bits each). The first register value specifies the Target Type. This is an enumerated value specifying which slaves are targeted by this command, i.e., in this case, which slaves should be abandon their static addresses and enter the dynamic pool. There are currently two possible values for the target type: #TARGET_ALL and #TARGET_DYN. The #TARGET_ALL value indicates that all slaves on the bus should execute the command, the #TARGET_DYN value indicates that only slaves that are already in the dynamic pool should execute the command.

The second MODBUS register value is a pair of octets specifying the bounds of the dynamic region to be used during this instance of the process 600. One octet specifies the first address in the dynamic region, the other octet specifies the final address in the dynamic region. In one example, the first address is the lower bound of the dynamic region and the second address is the upper bound of the dynamic region, but this is not strictly required for all examples. In some examples, slaves interpret the lower of these two values as the first, and the greater of the values as the last. In this example, the values given are included in the dynamic region.

Communication errors that occur during execution of the Enter Dynamic Pool command may be handled in a variety of ways. For instance, according to one example, the master transmits the Enter Dynamic Pool command multiple times before proceeding further in the process 600 to decrease the likelihood that a communication error prevented one of the slaves from receiving and processing the command. In another example, the master iterates through the addresses included in the static region, issuing messages using each static address, to ensure that no response are received. In still another example, the slaves are configured to provide a visual indication that they have received the command and a user inspects the slaves after the command is issued by the master.

In some examples, the master may dynamically select the dynamic region based on the number of slaves expected to enter the dynamic pool and the total number of addresses in the address space. A larger dynamic region will tend to decrease the number of collisions and therefore the number of rounds required to clear the dynamic pool. However, a larger dynamic region will increase the number of addresses that need to be visited in each round, and therefore the amount of time required to complete a round. Furthermore, a larger dynamic region may require a smaller static region because both regions exist within a single address space. In some examples, the master balances these effects in order to decrease the amount of time required to complete the automatic address assignment process.

Figure 12:
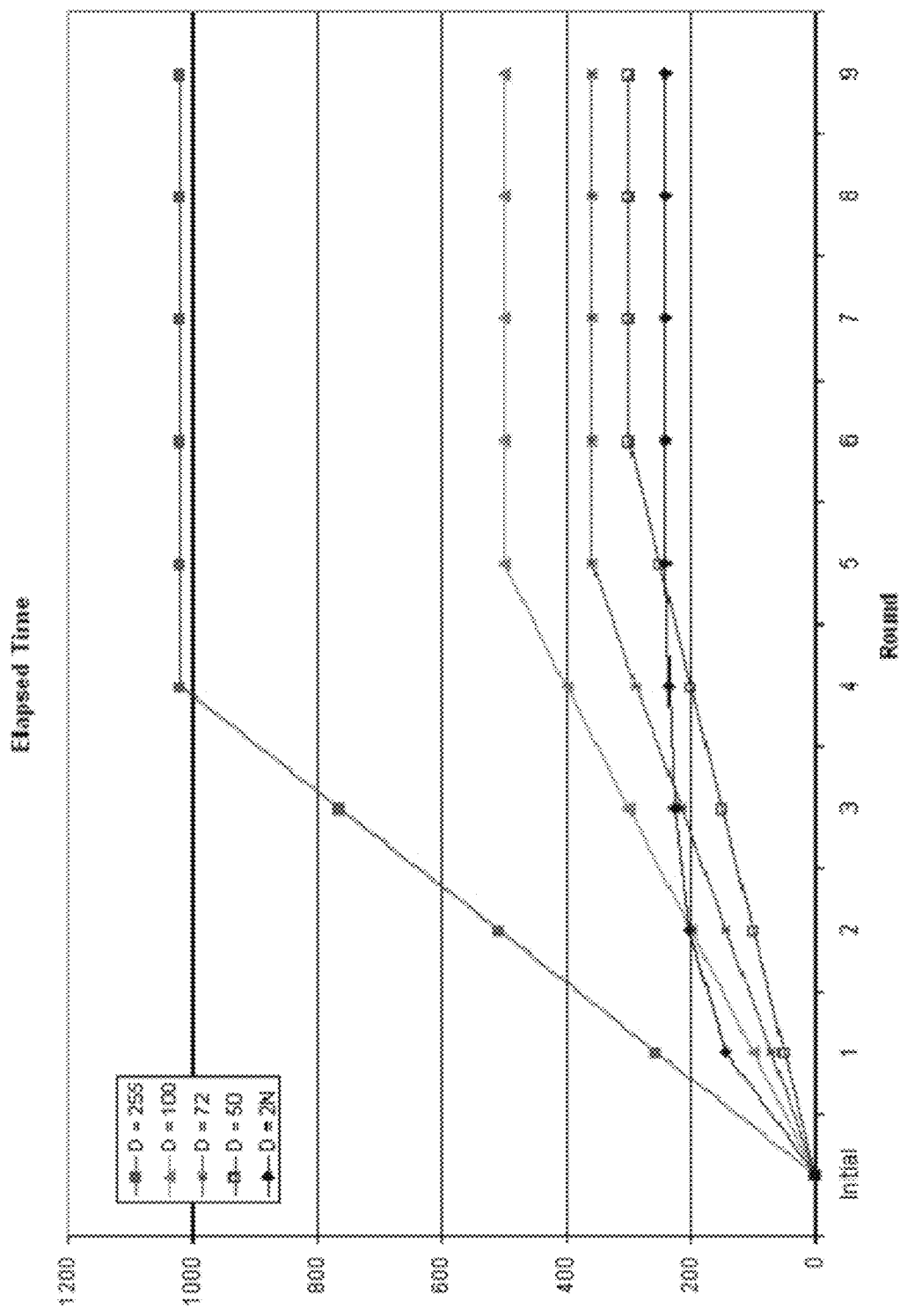
FIG. 12 is a line graph depicting the performance of an automatic address assignment process using dynamic regions of various sizes.

FIG. 12 illustrates the time required to automatically assign addresses using dynamic regions of various sizes. As shown in FIG. 12, the automatic address assignment process finishes more quickly where the master adjusts the size of the dynamic region to be twice as large as the number of slaves within the dynamic pool at the beginning of the round. Thus, in this example, varying the size of the dynamic region leads to results that are superior to maintaining a constant size across rounds.

Also at act 602, the master clears any stored static address assignments. Further the master initializes a variable, "saddr," to the first address in the static address region. The saddr variable is used by the master to track of the next available static address.

It is to be appreciated that targeting all slaves with #TARGET_ALL is required only when it is necessary to assign a new static address to every slave. This may be the case if, for instance, several slaves have failed or been removed from the system without updating the master's list of used static addresses. Targeting all slaves for automatic addressing is one way (though not necessarily the best way) to ensure that the master has updated information on the state of the network.

In some examples, a portion of the slaves present on the network may already have assigned and stored static addresses. If the master has a list of which static addresses are used by the slaves, the process 600 can begin by targeting #TARGET_DYN, in which case only new slaves that don't already have static addresses will participate, allowing the process to complete more quickly. In one example, the master may broadcast its own serial number to all slaves prior to issuing a message including the #TARGET_DYN command. As is discussed further below, according to this example, the slaves that already have an assigned static address compare the serial number broadcast by the master to the serial number of the master that assigned their current static addresses. Further, in this example, any slave that detects that these serial numbers are not the same relinquishes it assigned static address so that the slave will participate in future address assignment processes conducted by the master. In this way, slaves removed from a pre-existing network may be added to a new network controlled by a new master using the same processes as uninitialized slaves without an assigned static address.

Each round starts at act 604 with the master initializing two additional variables, "daddr" and "rcount." The daddr variable tracks which dynamic address is used next and is initialized to the first address in the dynamic region as defined in the Enter Dynamic Pool command. The rcount variable keeps track of the number of responses (valid or otherwise) that have been received during the round and is initialized to 0.

In act 606, the master determines if the daddr variable has an ordinal value within the dynamic region that is less than or equal to the final address in the dynamic region as defined in the Enter Dynamic Pool command. If so, the master executes act 608. Otherwise, the master executes act 624.

In act 608, the master unicasts a Read Serial Number request to address "daddr" and waits for a response. The master uses the Read Serial Number command to retrieve a unique serial number of a slave. In the MODBUS application protocol, this command takes the form of a "Read Input Registers" function. In accordance with the MODBUS application protocol, when executing the act 608, the master includes a "Read Input Registers" function within the message communicating the Read Serial Number request to slaves. The MODBUS Read Input Registers function is used to retrieve data from a slave. The register address to be read from specifies what data is to be retrieved.

In at least one example, the application layer packet embedded in the request message is formatted as shown in Table 2.

TABLE 2

| Offset | MODBUS Field | CTBus Field | Value |
| --- | --- | --- | --- |
| 0 | Function code (Read Input Registers) | MB Func Code | "0x04" |
| 1 | Reg Addr Hi | CTBus Request Hi | #SERIAL_NUMBER_ADDR_HI |
| 2 | Reg Addr Lo | CTBus Request Lo | #SERIAL_NUMBER_ADDR_LO |

TABLE 2-continued

| Offset | MODBUS Field | CTBus Field | Value |
| --- | --- | --- | --- |
| 3 | Reg Count Hi | MB Reg Count Hi | 0x00 |
| 4 | Reg Count Lo | MB Reg Count Lo | #SERIAL_NUMBER_SIZE |

In this example, the register address specifies that the serial number is to be retrieved. This address is represented by the pair of octet-constants #SERIAL_NUMBER_ADDR_HI and #SERIAL_NUMBER_ADDR_LO. The number of registers that make up the serial number are fixed at an application-specific constant value #SERIAL_NUMBER_SIZE. This value must be large enough to hold the entire serial number. It is to be appreciated that to be strictly compliant with MODBUS, the serial number must not exceed 122 registers (244 octets). This is based on the maximum number of registers that can be written to at one time, and additional constraints imposed by the process 600 as discussed below. Communication errors that occur during execution of the Read Serial Number request or response may be handled by having the master, or a user, count the number of slaves in the static region after execution of the process 600 has completed to ensure that all slaves are within the static region.

In act 610, the master determines if a predetermined period of time has elapsed between transmission of the Read Serial Number request and receipt of a response. In at least one example, this predetermined period of time (referred to as a timeout period, is configured to be about 2 ms). If so, the master determines that a timeout has occurred and increments the daddr variable to the next address in the dynamic region in act 612, prior to executing the next iteration. Otherwise, the master continues to wait until the predetermined period of time has elapsed or until a response is received. If a response is received prior to expiration of the predetermined period of time, the master increments the rcount variable in act 614.

In act 616, the master determines if the response is valid. In one example, validity is determined by performing an integrity check on the response. This integrity check may validate the format of the response as well as the data included in the response (via, for example, a 16-bit MODBUS CRC check). If the response is then determined to be invalid (malformed or failed integrity check), the master increments the daddr variable to the next address in the dynamic region in act 612 and continues with the next iteration.

In act 618, the response has arrived in time and appears to be valid so the master unicasts the "Assign Static Address to Serial Number" request to the address specified by the daddr variable using the current value of saddr variable as the static address to assign and using the serial number of the previous response as the target. The master then waits for a response. The Assign Static Address to Serial Number request is used by the master to assign a specific address from the static region of the address space to a slave with a specific serial number Like the Enter Dynamic Pool command described above, the Assign Static Address to Serial Number request is issued using the MODBUS Write Multiple Registers function with a specific register address value to indicate that it is the Assign Static Address to Serial Number request.

In accordance with the MODBUS Write Multiple Registers format, message octets 3 and 4 specify the number of registers being written to, and octet 5 specifies the number of data bytes included in the payload of the message. The number of register written to (message octets 3 and 4) is an application specific value represented by the constant

ASSIGN_SA_SN_SIZE_R. This value must be at least the 1 greater than the associated constant #SERIAL_NUMBER_SIZE, which specifies the number of registers required to hold the serial number. It must be at least one greater because this message contains the complete serial number and one additional register to specify the static address. Note that the value of #ASSIGN_SA_SN_SIZE_R may not exceed 123 per MODBUS specifications (this is maximum number of registers that can be written to at once). This is also why the serial number is limited to 122 register (244 octets). The octet count at message octet 5 is simply equal to twice the register count. This value is represented by the constant #ASSIGN_SA_SN_SIZE_B, and this value must be equal to twice #ASSIGN_SA_SN_SIZE_R.

The first register value in the request (message octets 6 and 7) is the static address to assign to the slave. Addresses can not exceed 8 bits, so the first octet in this register is fixed at 0x00. The second (least significant) octet of the register contains the static address.

The remainder of the register values is the serial number of the slave to which the address is being assigned. It is to be appreciated that slaves need not interpret this strictly as a write command because it is not necessary for any device to actually store the given serial number at the given address. Instead, the serial number is used as a way to target a specific device based serial number, instead of just by communications address, as explained below. The serial number is transmitted as a series of octets in order, with the first octet of the serial number at an offset of 8 in the message.

In act 620, the master determines if a valid response (acknowledgment) has arrived before expiration of a predetermined period of time. The master may check the validity of the response using the format or content of the response, as described above in act 616. If a valid response is received in a timely manner, the master records the assignment or increments the saddr variable to the next static address in act 622. In at least one example, the master records the assignment by storing an association between the assigned static address and the serial number of the slave to which the static address was assigned. If an invalid response is received, or no response is received prior to expiration of the predetermine period of time, the master does not record the assignment and does not increment the saddr variable so that the same static address will be used again for the next assignment.

Once the loop ends because the daddr variable has an ordinal value that is greater than the final address in the dynamic region (i.e. the dadder variable has been incremented to the end of the set), the master executes the act 624 to prepare for the next round. In the act 624, the master determines if the rcount variable is equal to 0. If so, the master determines that no responses (valid or invalid) were received during the current round, and so the master terminates the process 600. According to another example, the master receives and stores the number of slaves to be added to the network and terminates the process 600 after assigning static addresses to the stored number of slaves.

In another example, the master periodically determines whether any slaves remain in the dynamic region and, if not, terminates the process 600. This determination may be triggered by various events, such as the master having received responses from more than a threshold number of slaves, the master having searched more than a threshold fraction of the dynamic region or the master having completed an address assignment round. Further, in this example, the master makes this determination according to the following process. First, the master broadcasts a new Enter Dynamic Pool command targeting slaves in the dynamic pool and specifying a dynamic region of one address (or relatively small number of addresses). Next, the master requests the serial number of any slaves using the one address or the relatively small number of addresses. If the master receives any responses to this request, or requests, the master resumes the process 600. Otherwise, the master terminates the process 600.

If the rcount variable is not equal to 0, the master executes the act 626. In the act 626, the master broadcasts another Enter Dynamic Pool command, this time targeting #TARGET_DYN. Then the master beings another round by executing the act 604. Processing in accord with the process 600 enable a master to automatically assign operating addresses to each slave coupled to a MODBUS network.

According to another example, the master determines whether any slaves on the network do not have assigned static addresses prior to conducting an automatic address assignment process such as the process 600. In this example, the master sends an Enter Dynamic Pool command specifying a single address (or a relatively small number of addresses) for the dynamic region and requests that only those slaves that do not already have a static address select a dynamic address. After processing these requests, slaves without static addresses will be at the same dynamic address (or a few dynamic addresses), so the master can quickly determine the existence of any such slaves via, for example, a Read Serial Number request as discussed above. If slaves without static addresses are found, the master may conduct an automatic address assignment process, such as the process 600.

Figure 13:
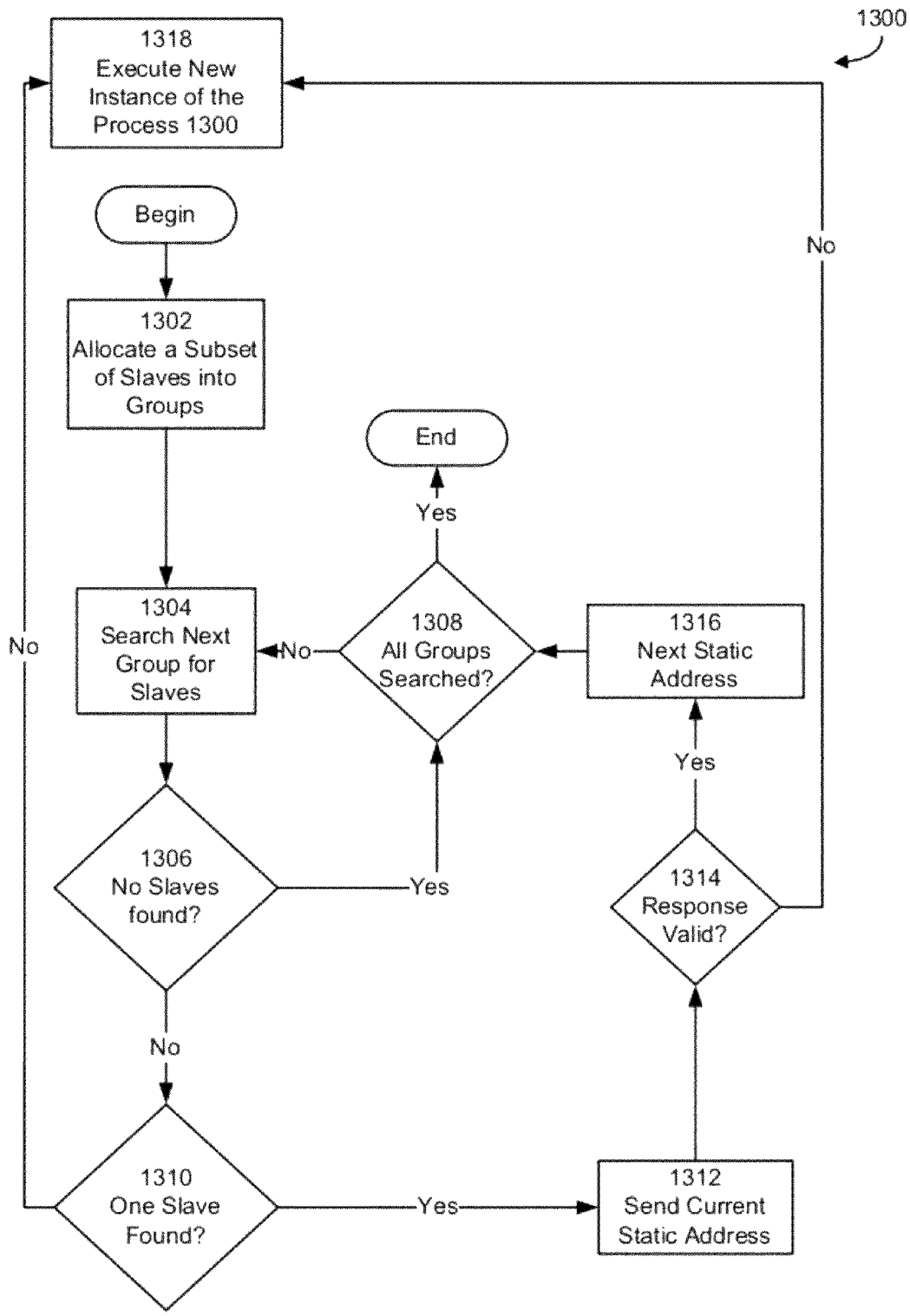
FIG. 13 is a flow diagram illustrating grouping based automatic address assignment process.

In another example, the master performs a grouping based automatic address assignment process, an example of which is illustrated as recursive process 1300 in FIG. 13. In act 1302, the master allocates a predetermined subset of slaves on the network into groups by unicasting, to the subset of slaves, an Enter Dynamic Pool command specifying a dynamic region of two or more predetermined addresses. According to this example, each of the groups is thereby associated with a dynamic address of the two or more addresses within the dynamic region. Further, in this example, the initial predefined subset of slaves includes all of the slaves on the network that do not have an assigned static address. In some examples, both the predetermined subset of slaves and the two or more predetermined addresses are passed to the recursive process 1300 by a process initiating the recursive process 1300, generated within the act 1302 according to a predetermined procedure or are stored within predetermined variables accessible by the recursive process 1300 (e.g. global variables).

In act 1304, the master searches the next group for slaves by requesting the serial number of any slaves that have adopted the dynamic address associated with the group. In act 1306, the master determines whether no slaves were included in the group by determining whether no responses to the serial number request were received before expiration of a timeout period. If the master receives no timely responses, the master proceeds to act 1308. Otherwise, the master proceeds to act 1310.

In the act 1308, the master determines whether all of the groups have been searched. If so, the master terminates the current instance of the recursive process 1300. Otherwise, the master returns to the act 1304.

In the act 1310, the master determines whether only one slave is included in the group being searched by determining whether a single response to the serial number request was received before expiration of a timeout period. If the master received a single timely response, the master assigns a static address to the responding slave in act 1312. Otherwise, the master determines that multiple slaves are included in the group and proceeds to act 1318. While in the example illustrated in FIG. 13, the master determines that multiple slaves are included in the group by a process of elimination of other possibilities, in other examples, this determination may be affirmatively made where the master receives multiple responses to the serial number request.

In the act 1312, the master sends the value of the current static address to the responding slave device. In act 1314, the master determines if a valid response is received within a predetermined period of time. If not, the master executes the act 1318. Otherwise, the master sets the value of the current static address variable to the next static address within the static address region in act 1316.

In act 1318, the master sets the predetermined subset of slaves to be used in the next instance of the recursive process 1300 to include the slaves within the group by providing the dynamic address associated with the group to the next instance of the recursive process 1300. In addition, the master provides the dynamic addresses associated any groups not yet searched by the current instance of the recursive process 1300 to the next instance of the recursive process 1300 to prevent the next instance of the recursive process 1300 from utilizing these already utilized dynamic addresses. Next, the master executes the next instance of the recursive process 1300. In this way, the master will continue to recursively execute the process 1300 until all of the slaves have been assigned static addresses.

In another example, the master is configured, as part of its manufacturing process, with the number of slaves to be added as part of its installation process. According to this example, the configured number of slaves to be added is equal to the number of slaves packaged with the master. Further, in this example, the master adjusts its address assignment process based on the configured number of slaves to be added. For instance, in one example, the master terminates the automatic address assignment process after assigning addresses to the configured number of slaves. In another example, the master determines whether additional slaves reside within the dynamic pool after assigning addresses to the configured number of slaves and terminates the automatic address assignment process if no additional slaves reside within the dynamic pool. In still another example, the master may adjusts the size of the dynamic region utilized to assign addresses based on the configured number of slaves.

As described above, the process 1300 illustrate in FIG. 13 is implemented as a recursive process. However, examples are not limited to a recursive implementation of the grouping based automatic address assignment process and some examples include an iterative implementation. In at least one example, the group based automatic address assignment process is a binary automatic address assignment process that utilizes a group size (dynamic region size) of two.

Target Device Processes

Figure 8:
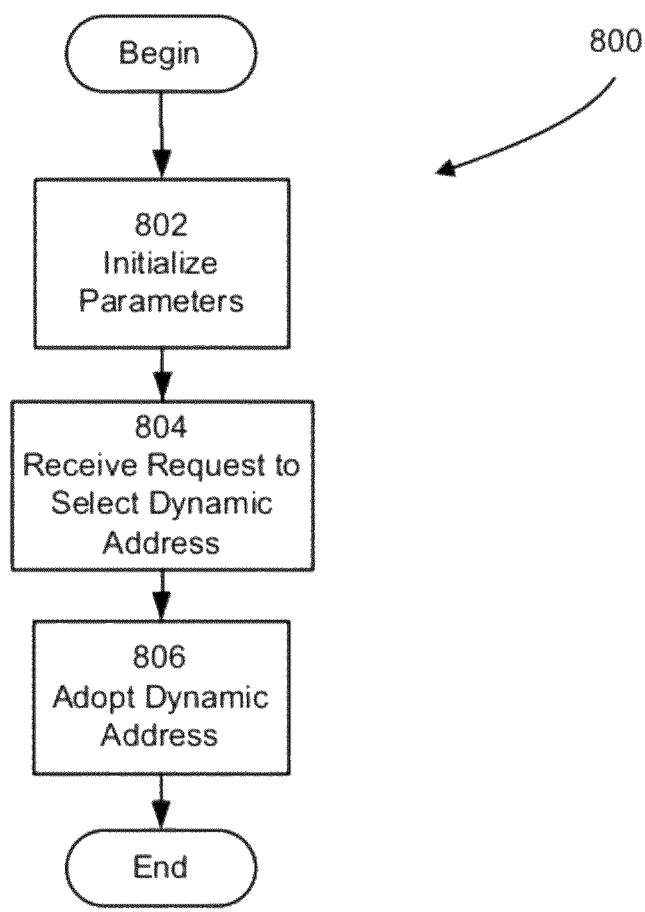
FIG. 8 is a flow diagram illustrating a process of initializing a configuration session.

As discussed above with reference to the act 702 of the process 700, in some examples, a target device, such as any of the devices 106, 108 and 110, initializes a configuration session. FIG. 8 illustrates an exemplary process 800 that may be implemented by the target device to achieve this purpose. As shown, the process 800 includes acts of initializing parameters, receiving a request to select a dynamic address and adopting the dynamic address.

In act 802, the target device performs an initialization process. This initialization process may include acts such as setting a communications address parameter of the target device to a value that causes the target device to process only broadcast messages. In addition, the initialization process may further allocate an "assignment" variable that indicates whether or not a static address has been assigned to the target device. The initialization process may further set the value of the assignment variable to a value that indicates the target device is not assigned a static address.

In act 804, the target device receives a request to select a dynamic address from the dynamic region. According to one example, the target device selects the dynamic address using a random or pseudo-random method. A true random number generator could take many forms. For instance, the target device could use an ADC to measure a disconnected pin, and use the noise as the random value. The noise from a reverse biased PN junction could also be sampled and used for this purpose. In general, the random values would need to be distilled by means of a hashing algorithm or by using them to seed a pseudo random number generator.

Next, in act 806, the target device adopts the selected dynamic address as its communication address by setting the value of the communication address parameter to the value of the selected dynamic address. Upon completion of the process 800, the target device is ready to participate in a configuration round in which the target device may be assigned a static address.

Figure 9:
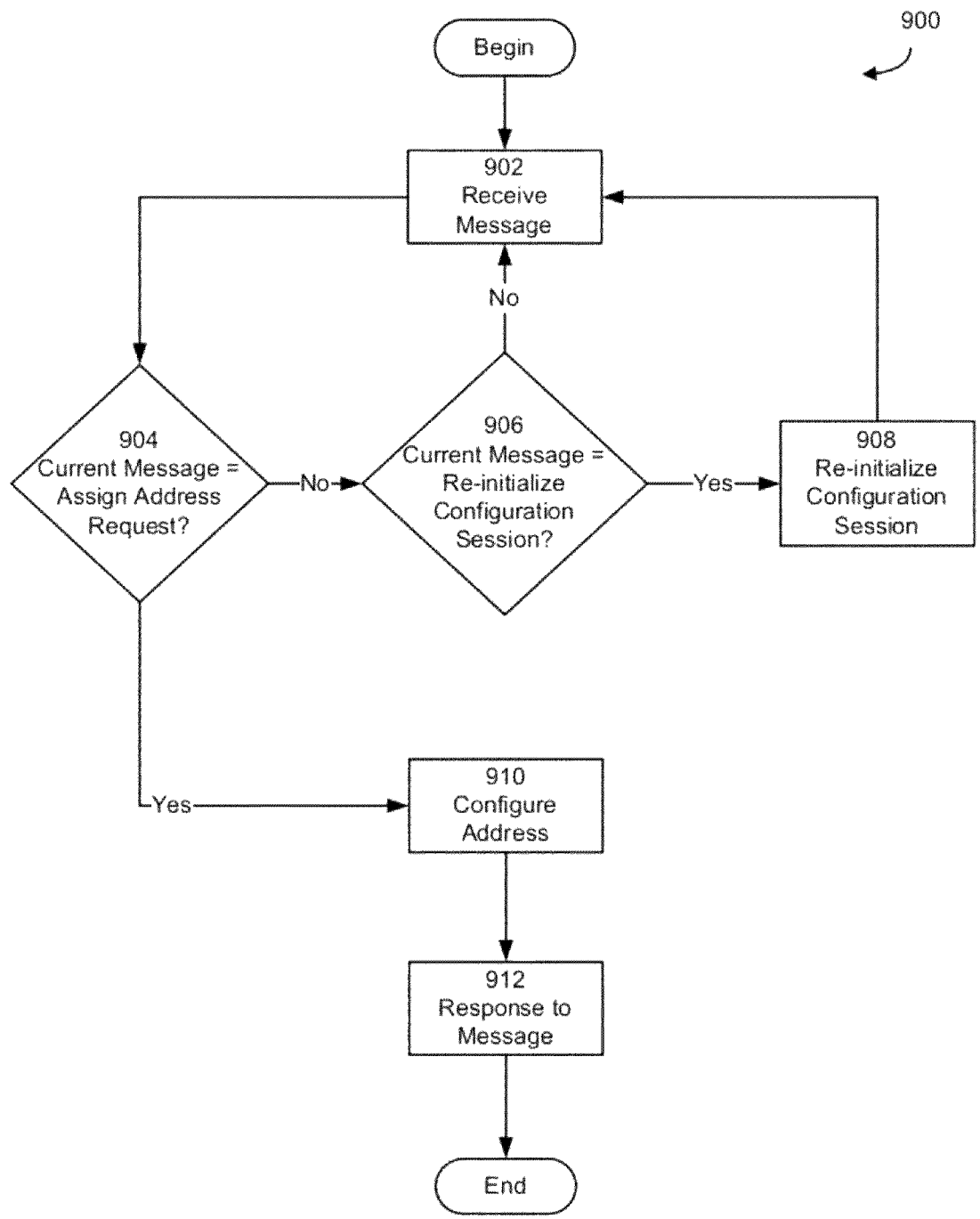
FIG. 9 is a flow diagram illustrating a method of processing configuration messages.

As discussed above with reference to the act 704 of the process 700, in some examples, a target device, such as any of the device 106, 108 and 110, processes configuration messages. FIG. 9 illustrates an exemplary process 900 that may be implemented by the target device to achieve this purpose. As shown, the process 900 includes several acts, each of which is discussed further below.

In act 902, the target device receives a message from the network. In act 904, the target device determines whether the message includes a request to assign a static address to the target device. If not, the target device executes act 906. Otherwise, the target device executes act 910.

In act 906, the target device determines if the current message includes a re-initialization request. If so, the target device re-selects a dynamic address from the dynamic region and configures itself to use the re-selected dynamic address by setting the value of the re-selected dynamic address as the value of the communications address parameter in act 908. Otherwise, the target device receives another message from the network by executing act 902.

In act 910, the target device configures itself to use the static address by assigning the value of the static address received in request to the communications address parameter. Next, in act 912, the target device responds to the message with an indication that the static address was successfully assigned and terminates the process 900.

Figure 10:
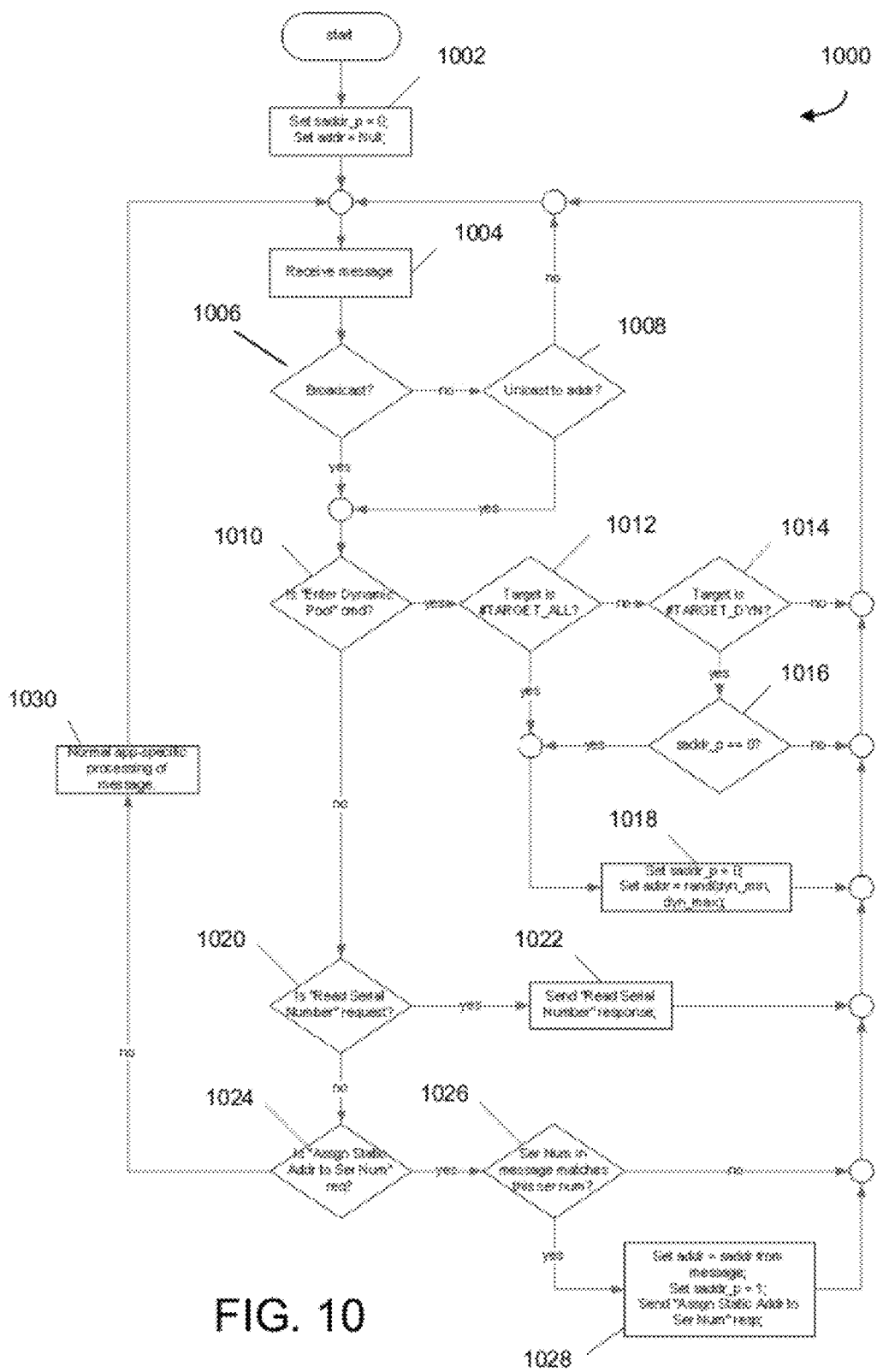
FIG. 10 is a flow diagram illustrating another process of configuring a target device to use an assigned address.

FIG. 10 illustrates another example of a process to receive an operating address by a slave within a MODBUS network. In some examples, each slave coupled to the MODBUS network executes the process 1000 depicted in FIG. 10 independently of one another. The example shown in FIG. 10 is presented in the context of a slave's normal operating mode because, in this example, there is no specific trigger to place the slave into an address assignment mode, per se. Instead, special cases for the particular messages that relate to the process 1000 are presented explicitly, and all other processing is represented by "app-specific processing" in the act 1030.

As shown in FIG. 10, the process 1000 begins at act 1002 where a slave initializes two variables. The first variable is an "saddr_p" variable that stores a predicate ("Boolean") value which indicates whether or not the slave has a static address assigned. Initially, the slave executing the process 1000 has no static address so the saddr_p variable is set to a value of 0. The second variable is an "addr" variable which indicates the communication address of the slave. In the example illustrated in FIG. 10, initially, the slave has no assigned communication address, so the addr variable is set to a special value of Null. This value will not match any unicast address so the slave will not act on any unicast messages. The Null value will, however, match the broadcast address, thus causing the slave to receive and process broadcast messages.

The slave proceeds into an infinite loop, starting with the act 1004 where the slave waits to receive a valid message. Upon receipt of a valid message, the slave determines if the message is a broadcast message addressed to all slaves in act 1006. If so, the slave executes the act 1010, otherwise, the slave executes the act 1008.

In the act 1008, the slave has determined that the message is not a broadcast message, so the slave compares the address in the message with its own address, stored in the addr variable, to determine if the message is addressed to it. If the slave determines that the addr variable has a value (such as the Null value) that does not match the address included in the message, the slave loops back to the act 1004 to accept another message. Otherwise, the slave determines that the message is a unicast addressed to the slave and executes the act 1010.

In act 1010, the slave determines whether the message includes an Enter Dynamic Pool command. If not, the slave executes the act 1020. If so, the slave determines whether or not it is targeted by the command in the acts 1012 and 1014. In the act 1012, the slave reads the message to determine if the Enter Dynamic Pool command is targeted to all slaves by including the #TARGET_ALL value in the Target Type field. If so, the slave executes the act 1018.

Otherwise, the slave executes the act 1016. In the act 1014, the slave determines whether the command is targeted to only the slaves remaining in the dynamic pool by including the #TARGET_DYN value in the Target Type field. Is so, the slave executes the act 1016. If not, the slave ignores the command and executes the act 1004 to wait for another message.

In the act 1016, the slave determines whether it is part of the dynamic pool by checking the saddr_p variable, which was initialed to 0 (false). If the saddr_p variable has a value of 0, then the slave is in the dynamic pool. The command, therefore, targets the slave, so the slave executes the act 1018. Otherwise, the saddr_p variable does not have a value of 0, which indicates that the slave has an assigned static address. Therefore, the slave is not part of the dynamic pool, not targeted by the command and executes the act 1004 to await another message.

In the act 1018, the slave sets the saddr_p variable to 0 (false) to indicate that it no longer has a static address because the command is placing the slave in the dynamic pool. Also in the act 1018, the slave chooses a random address from the dynamic region defined in the Enter Dynamic Pool command and assigns this value to its "addr" variable, thereby adopting the randomly determined address from the dynamic region as its communication address. Having completed processing of the command, the slave executes the act 1004 to wait for another message.

In the act 1020, the slave determines whether the message includes a Read Serial Number request. If not, the slave executes the act 1024. If so, the slave executes the act 1022 to send back its serial number in a "Read Serial Number" response, and then executes that act 1004 to await another message. In at least one example, the application layer packet embedded in the response message is formatted as shown in Table 3.

TABLE 3

| Offset | MODBUS Field | CTBus Field | Value |
|---|---|---|---|
| 0 | Function code (Read Input Registers) | MB Func Code | "0x04" |
| 1 | Byte Count | MB Byte Count | #SERIAL_NUMBER_SIZE_B |
| 2 | Reg 0 value Hi | Serial Number Octet 0 | Serial_Number[0] |
| 3 | Reg 0 value Lo | Serial Number Octet 1 | Serial_Number[1] |
| ... | ... | ... | ... |
| 2N | Reg N value Hi | Serial Number Octet 2N − 2 | Serial_Number[2N − 2] |
| 2N + 1 | Reg N value Lo | Serial Number Octet 2N − 1 | Serial_Number[2N − 1] |

The second octet in the response message is the number of data octets in the serial number. This is fixed at an application specific value represented by the constant #SERIAL_NUMBER_SIZE_B. The serial number consists of a sequence of octets. These octets are transmitted in order in the message, starting with the first octet of the serial number at an offset of 2 in the message, as shown in the table. In the table, the number of 16-bit registers needed to hold the serial number is represented by N. The serial number may be either 2N octets or 2N−1 octets (i.e., the final register may only have one relevant octet of data). The master and slave are expected to know the correct number of octets and ignore the final octet if appropriate. The final octet must, however, still be transmitted in the response even if it is not used. As previously explained, the serial number cannot exceed 244 octets.

In the act 1024, the slave determines whether the message includes an Assign Static Address to Serial Number request. If not, the slave executes the act 1030 prior to executing the act 1004 to await another message. If the message includes an Assign Static Address to Serial Number request, the slave determines whether the serial number in the request matches its own serial number in the act 1026. If the serial number in the request does not match the serial number of the slave, the slave ignores the request and executes the act 1004 to wait for another message.

If the serial number in the request matches the serial number of the slave, the slave executes the act 1028. In the act 1028, the slave accepts the address assignment by assigning the static address included in the request to addr variable. The slave also sets its saddr_p variable to 1 (true) to indicate that the slave has an assigned static address. Finally, the slave acknowledges the successful assignment by sending an "Assign Static Address to Serial Number" response back to the master, and then executes the act 1004 to wait for another message. In at least one example, the application layer packet embedded in the response message is formatted as shown in Table 4.

TABLE 4

| Offset | MODBUS Field | CTBus Field | Value |
|---|---|---|---|
| 0 | Function code (Write Multiple Registers) | MB Func Code | "0x10" |
| 1 | Reg Addr Hi | CTBus Command Hi | #ASSIGN_SA_SN_HI |
| 2 | Reg Addr Lo | CTBus Command Lo | #ASSIGN_SA_SN_LO |

TABLE 4-continued

| Offset | MODBUS Field | CTBus Field | Value |
|---|---|---|---|
| 3 | Reg Count Hi | MB Reg Count Hi | "0x00" |
| 4 | Reg Count Lo | MB Reg Count Lo | #ASSIGN_SA_SN_SIZE_R |

The Assign Static Address to Serial Number response is simply an acknowledgement, and does not contain any additional data from the slave. Message octets 1 and 2 simply echo the Assign Static Address to Serial Number command value from the request, and octets 3 and 4 echo the 16-bit register count value from the request. This value may not exceed 123 per MODBUS specifications, and is represented by the constant #ASSIGN_SA_SN_SIZE_R.

Communication errors that occur during execution of the Assign Static Address to Serial Number response may be handled by having the master, unicast a simple request to the static address that it attempted to assign. If the master receives a response, the master may process the response as an acknowledgement.

According to one example discussed above with regard to FIG. 6, a master may broadcast its serial number to slaves prior to issuing a request for the slaves that do not have an assigned static address to enter the dynamic pool. In this example, slaves that have an assigned, but potentially non-unique, static address stored in the addr variable also store an identifier of the master that assigned the static address to the slave. Further, according to this example, the slaves that already have an assigned static address compare the serial number broadcast by the master to the stored serial number of the master that assigned their current static addresses. Further, in this example, any slave that detects that these serial numbers are not the same sets the value of the addr variable to Null so that the slave will participate in future address assignment processes conducted by the master. In this way, slaves removed from a pre-existing network may be added to a new network controlled by a new master using the same processes as uninitialized slaves without an assigned static address.

Processes 300 through 1000 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and processes discussed herein. Furthermore, as discussed above, in at least one example, the acts are performed on a particular, specially configured machine, namely a computer system configured according to the examples disclosed herein.

Usage Scenarios

Figure 11:
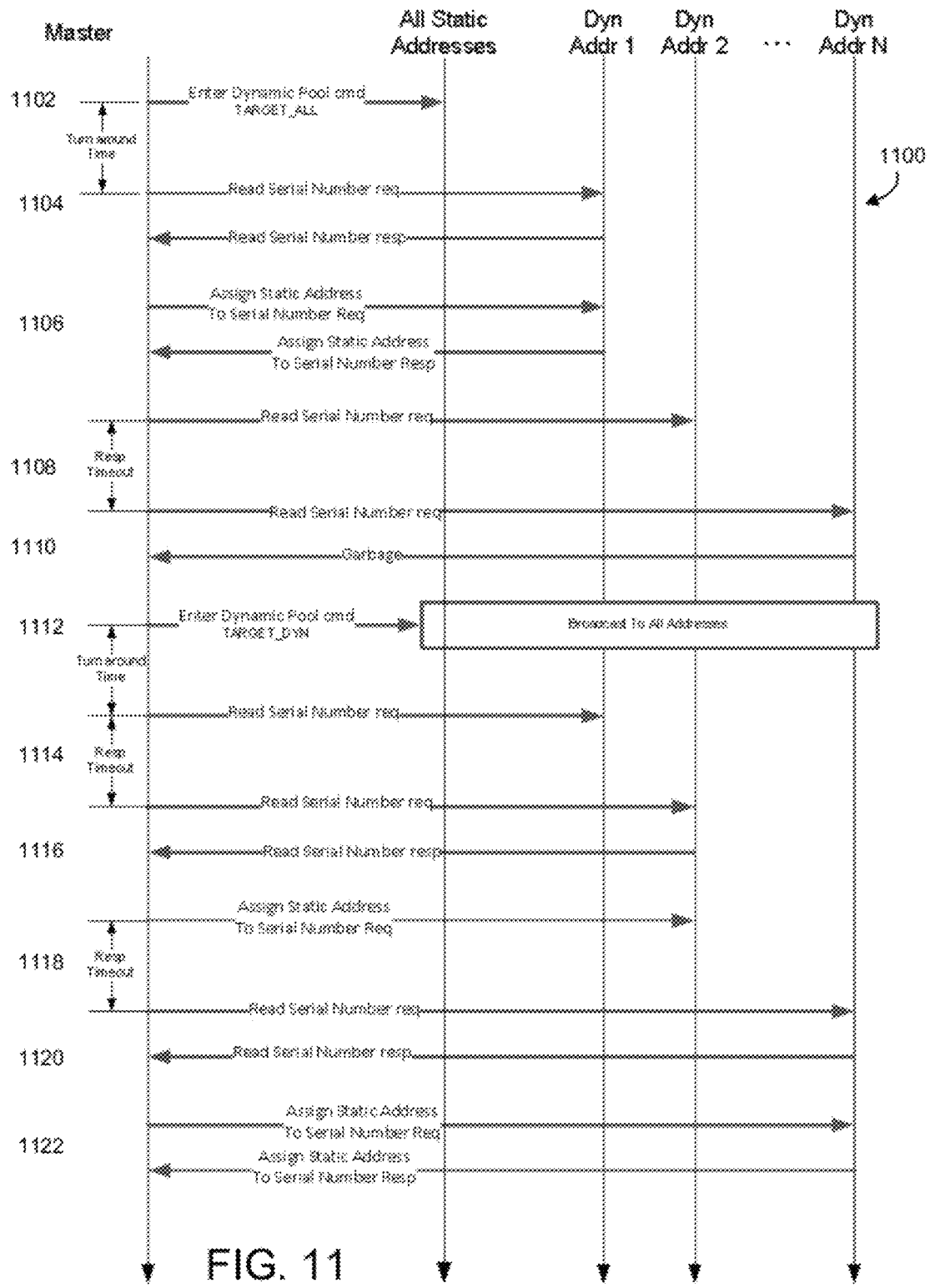
FIG. 11 is a chronological schematic illustrating an exemplary execution of an automatic address assignment process.

FIG. 11 provides a chronological view of the execution of an exemplary address assignment process 1100. As illustrated in FIG. 11, time flows from top to bottom and horizontal lines indicate messages exchanged between devices. The process begins at 1102 where the master broadcasts an Enter Dynamic Pool command to all addresses. The Target Type field of the command is set to #TARGET_ALL. The exact values used for the Dyn Region Bounds fields are not specified in this example.

Upon receiving this message, all slaves will abandon their current assigned address (if any) and randomly choose a new one from the dynamic region specified in the command. Since this is a broadcast message, no slaves respond to it. The master must therefore wait an appropriate amount of time to ensure that all slaves have had time to act on the command, before it sends another message.

Once this time has elapsed, the first round begins at 1104 with the master unicasting a Read Serial Number request to the first dynamic address (i.e., the lesser of the two bounds specified in the previous Enter Dynamic Pool command). Any slaves that have selected the first dynamic address as their communications address will respond with a Read Serial Number response, providing their serial number. In the example illustrated in the FIG. 11, only one slave that has selected the first dynamic address and that slave responds with its serial number.

When the master receives this response, it determines that there is a slave at the dynamic address, so the master attempts to move that slave out of the dynamic pool and into the static region. It does this at 1106 by unicasting an Assign Static Address to Serial Number request to the first dynamic address. This request contains the static address that the master wishes to assign to the slave and the serial number that the master received in the Read Serial Number response. When the slave receives this request, the slave confirms that the serial number included in the message matches it's own, and then accepts the assigned static address, thereby leaving the dynamic pool. The slave acknowledges the assignment by responding to the master with a Read Serial Number response. When the master receives this response, the master records the address assignment in its own records.

At 1108, the master advances to the next address in the dynamic region and sends another Read Serial Number request. In this example, none of the slaves have selected this dynamic address, and so the master receives no response. After an predetermined timeout period has elapsed, the master proceeds with the next address in the dynamic region.

At 1110, the response to the Read Serial Number request comes to the master as a garbled packet, meaning either that it was malformed and could not be parsed, or that the data integrity check on it failed. This most likely indicates that a collision has occurred at this dynamic address, meaning that more than one slave has selected this dynamic address as their communications address. In this case, the master cannot effectively assign a static address to any one of the colliding slaves because they all share a communications address and the master does not have a valid serial number for any one of them. Thus, all of the slaves that collided at this address will continue through to the next round.

The master initiates the next round at 1112 by broadcasting another Enter Dynamic Pool command. However, given that this round is not the initial round, the master only targets the slaves that remain in the dynamic pool because those slaves that were cleared from the dynamic pool into the static address region in the last round have no need to participate in this round. Thus, the Target Type field of the request is set to #TARGET_DYN. The master sets the bounds for the dynamic region through this command. It is to be appreciated that the master is not required to set the bounds used in this round to the bounds used in the first round; the master has the option of changing the bounds based on the current circumstances. For instance, the number of slaves still in the dynamic pool will most likely be reduced for this round. Thus, the master may use a smaller dynamic region in order to process the region faster because the master may have determined that a threshold number of slaves were cleared in the first round. Conversely if more than a threshold number of collisions occurred in the first round, the master may enlarge the dynamic region in this next round.

Again, the master waits the appropriate turn around time after issuing the command before beginning to send Read Serial Number requests. At 1114, the master sends the request to the first dynamic address. In the first round in the example there was a slave at this address. In the current round, the master receives no response, indicating that there is no slave at this address. This illustrates that the dynamic addresses selected by particular slaves may vary between rounds.

After waiting a predetermined amount of time for a response, the master proceeds to the next dynamic address and sends another Read Serial Number request. At 1116, the master receives an apparently valid Read Serial Number response. So, the master sends an Assign Static Address to Serial Number request back to the dynamic address. The request includes an indication of a free static address and the serial number that was received in the previous response. However, according to this example, the master receives no response to the request and the request times out at 1118.

Such a timeout may indicate a variety of issues. For instance, according to one example, the timeout indicates a network failure. According to another example, the timeout indicates a master or slave communication failure. However, in yet another example, despite the fact that the previous response appeared valid (i.e., the previous response was well formed and passed al data integrity checks), it included a serial number other than a serial number for one of the slaves that issued a response and so no slave acknowledged the assignment. This can happen if there was, in fact, a collision at the dynamic address, and so two or more slaves both responded to the Read Serial Number request, each with their own serial number. In this situation, there is a slim, but non-zero, chance that the collision would yield a well-formed response that even passes the data integrity check, but the serial number reported in the response would be a combination of the serial numbers of all the responding slaves (the nature of this combination depends on the physical layer of the communication, i.e. how bits are actually presented on the communication medium).

When such a non-error causing collision occurs, the address assignment process will still function properly. When the master sends the resulting serial number in the assignment request, the serial number will not match any of the slaves, and so no slave will accept the assignment. In this case, the lack of an Assign Static Address to Serial Number response, rather than the lack of a valid Read Serial Number response indicates the collision to the master. Upon failing to receive the response within the valid timeout period, the master simply proceeds as normal to the next dynamic address.

At 1120, the master sends another Read Serial Number request to another dynamic address, and gets back a valid Read Serial Number response. Continuing in 1122, the master sends another Assign Static Address to Serial Number request, and receives a valid Assign Static Address to Serial Number response, indicating that the static address assignment was accepted by the slave with that serial number.

This last pair of transactions (Read Serial Number and Assign Static Address to Serial Number) appear to be a non-collision, but this is not necessarily the case. It is possible that two or more slaves collided at this dynamic address, but the colliding Read Serial Number responses actually yielded a well formed error-free response with a correct serial number. This can happen depending on the actual colliding serial numbers and on how colliding data combines in the physical layer. For instance, a physical layer where zeroes are written by floating the bus and ones are written by actively driving the bus may result in colliding data yielding a bit-wise OR of the colliding messages. In such a situation, all bits with a value of 1 will survive the collision, and so certain combinations of messages could result in one of the messages surviving in its entirety. Although this collision is not directly detectable by at least one example of the master (i.e., an exemplary master without additional error detection mechanisms), this collision does not harm the address assignment process because the static address assignment is still successful, and the size of the dynamic pool is thus reduced for the next round.

However, given that there are a certain (albeit rare) class of collisions that the master in this example cannot detect, a possibility exists that at least one slave remains in the dynamic pool after any round in which the master received at least one response to a Read Serial Number request. Therefore, to ensure that all slaves are cleared, at least one example of the assignment process continues until, within a final round, no slaves respond at any of the dynamic addresses. This will guarantee that there are no functioning slaves left in the dynamic pool. Further, according to this example, because these undetected collisions are rare, the master may use a smaller dynamic region after a round in which the master has detected no collisions. By using a smaller dynamic region, the master may conduct the final round more rapidly.

The systems and methods disclosed herein may be applied within a variety of contexts and used with a wide assortment of devices. For instance, in one example, a residential power system employs an automatic address assignment process disclosed herein to assign addresses to current transformers that measure branch circuit currents within a home. In another example, an industrial power system employs an automatic address assignment process to assign address to multiple parallel uninterruptible power supplies. In yet another example, an automobile control system employs an automatic address assignment process to assign addresses to sensors disposed within a car. Other exemplary address assignment processes may provide static addresses to home automation equipment and displays, security and safe devices, electrical and other energy monitoring devices, power distribution equipment, uninterruptible power supplies, HVAC and other temperature management equipment, lighting control systems, smart or mobile electrical receptacles and appliance control devices. Thus, the exemplary systems and processes disclosed herein are well suited for use within environments that require low cost and highly robust data communications.

Having thus described several aspects of at least one example, it is to be appreciated that various alterations, modifications, and improvements will readily occur to those skilled in the art. For instance, while the bulk of the specification discusses address assignment within a MODBUS network having a shared bus topology, examples may be utilized in other networks having a shared bus topology but employing standards other than MODBUS. For instance, examples may be utilized in any network having the following characteristics: a shared bus topology, a communications protocol that supports unicast and broadcast messaging, communications addresses that do not exceed 8 bits, target devices that have a unique identifier that does not exceed 244 octets, a source device able to detect the receipt of messages that are determined to be garbled (poorly formed or failing integrity checks) and able to detect and handle response timeouts. In addition, examples may be implemented between devices connected via a local bus within a single device. Such alterations, modifications, and improvements are intended to be part of this disclosure, and are intended to be within the scope of the examples discussed herein. Accordingly, the foregoing description and drawings are by way of example only.

What is claimed is:

1. An address assignment device for assigning addresses to a plurality of target devices within a network, the address assignment device comprising a memory and at least one processor coupled to the memory and being configured to:
   instruct each target device of the plurality of target devices to respectively select a first dynamic address from a first set of dynamic addresses at least in part by:
      providing an indication of a first address of the first set of dynamic addresses to each target device of the plurality of target devices; and
      providing an indication of a last address of the first set of dynamic addresses to each target device of the plurality of target devices;
   respectively assign a different static address to each target device of the plurality of target devices having a first dynamic address that uniquely identifies the target device;
   instruct each target device of the plurality of target devices having a first dynamic address that identifies at least two target devices of the plurality of target devices to respectively select a second dynamic address from a second set of dynamic addresses; and
   respectively assign another different static address to each target device of the plurality of target devices having a second dynamic address that uniquely identifies the target device.

2. The address assignment device according to claim 1, wherein the first set of dynamic addresses has a cardinality different from a cardinality of the second set of dynamic addresses.

3. The address assignment device according to claim 1, wherein the address assignment device is further configured to respectively receive confirmations from each target device of the plurality of target devices having a first dynamic address that uniquely identifies the target device.

4. The address assignment device according to claim 1, wherein the address assignment device is further configured to:
   respectively request an identifier from each target device of the plurality of devices using the first dynamic address selected by the target device; and
   respectively receive the identifier from each target device of the plurality of target devices having a first dynamic address that uniquely identifies the target device, wherein the address assignment device is configured to respectively assign a different static address to each target device of the plurality of target devices having a first dynamic address that uniquely identifies the target device responsive to receipt of the identifier of the target device.

5. The address assignment device according to claim 4, wherein the identifier includes at least one of a serial number, a microprocessor identifier, a number generated from a random number generator and a number generated from a true random number generator.

6. The address assignment device according to claim 1, wherein the address assignment device is further configured to:
   respectively request an identifier from each target device of the plurality of target devices using the second dynamic address selected by the target device; and
   responsive to receiving no identifiers, discontinue assigning addresses.

7. The system according to claim 1, wherein the network is a master-slave network and the plurality of target devices includes a plurality of slave devices.

8. A method of assigning addresses to a plurality of target devices using an address assignment device, the address assignment device including a memory and at least one processor coupled to the memory, the method comprising:
   instructing, by the address assignment device via a network, each target device of the plurality of target devices to respectively select a first dynamic address from a first set of dynamic addresses at least in part by:
      providing an indication of a first address of the first set of dynamic addresses to each target device of the plurality of target devices; and
      providing an indication of a last address of the first set of dynamic addresses to each target device of the plurality of target devices;
   respectively assigning, by the address assignment device, a different static address to each target device of the plurality of target devices having a first dynamic address that uniquely identifies the target device;
   instructing, by the address assignment device, each target device of the plurality of target devices having a first dynamic address that identifies at least two target devices of the plurality of target devices to respectively select a second dynamic address from the a second set of dynamic addresses; and
   respectively assigning, by the address assignment device, another different static address to each target device of the plurality of target devices having a second dynamic address that uniquely identifies the target device.

9. The method according to claim 8, wherein instructing each target device of the plurality of target devices having a first dynamic address that identifies at least two target devices of the plurality of target devices to respectively select a second dynamic address includes instructing each target device of the plurality of target devices to select from a second set of dynamic addresses having a cardinality different from a cardinality of the first set of dynamic addresses.

10. The method according to claim 8, further comprising respectively receiving confirmations from each target device of the plurality of target devices having a first dynamic address that uniquely identifies the target device.

11. The method according to claim 8, further comprising:
   respectively requesting an identifier from each target device of the plurality of target devices using the first dynamic address selected by the target device; and
   respectively receiving the identifier from each target device of the plurality of target devices having a first dynamic address that uniquely identifies the target device, wherein the act of respectively assigning a different static address to each target device of the plurality of target devices having a first dynamic address that uniquely identifies the target device is responsive to receipt of the identifier of the target device.

12. The method according to claim 11, wherein respectively receiving the identifier includes receiving at least one of a serial number, a microprocessor identifier, a number generated from a random number generator and a number generated from a true random number generator.

13. The method according to claim 8, further comprising:
   respectively requesting an identifier from each target device of the plurality of target devices using the second dynamic address selected by the target device; and
   responsive to receiving no identifiers, discontinuing assigning addresses.

14. A non-transitory computer readable medium having stored thereon sequences of instruction for assigning addresses to a plurality of target devices within a network including instructions that will cause at least one processor of an address assignment device to:
  instruct each target device of the plurality of target devices to respectively select a first dynamic address from a first set of dynamic addresses at least in part by:
    providing an indication of a first address of the first set of dynamic addresses to each target device of the plurality of target devices; and
    providing an indication of a last address of the first set of dynamic addresses to each target device of the plurality of target devices;
  respectively assign a different static address to each target device of the plurality of target devices having a first dynamic address that uniquely identifies the target device;
  instruct each target device of the plurality of target devices having a first dynamic address that identifies at least two target devices of the plurality of target devices to respectively select a second dynamic address from the a second set of dynamic addresses; and
  respectively assign another different static address to each target device of the plurality of target devices having a second dynamic address that uniquely identifies the target device.

15. The non-transitory computer readable medium according to claim 14, wherein the sequences of instruction include instructions that will cause the at least one processor of the address assignment device to instruct each target device of the plurality of target devices having a first dynamic address that identifies at least two target devices of the plurality of target devices to respectively select a second dynamic address by instructing each target device of the plurality of target devices having the first dynamic address to select from a second set of dynamic addresses having a cardinality different from a cardinality of the first set of dynamic addresses.

16. The non-transitory computer readable medium according to claim 14, wherein the sequences of instruction include instructions that will further cause the at least one processor of the address assignment device to respectively receive confirmations from each target device of the plurality of target devices having a first dynamic address that uniquely identifies the target device.

17. The non-transitory computer readable medium according to claim 14, wherein the sequences of instruction include instructions that will further cause the at least one processor of the address assignment device to:
  respectively request an identifier from each target device of the plurality of target devices using the first dynamic address selected by the target device; and
  respectively receive the identifier from each target device of the plurality of target devices having a first dynamic address that uniquely identifies the target device, wherein the act of respectively assigning a different static address to each target device of the plurality of target devices having a first dynamic address that uniquely identifies the target device is responsive to receipt of the identifier of the target device.

18. The non-transitory computer readable medium according to claim 17, wherein the sequences of instruction include instructions that will further cause the at least one processor of the address assignment device to respectively receive the identifier by receiving at least one of a serial number, a microprocessor identifier, a number generated from a random number generator and a number generated from a true random number generator.

19. The non-transitory computer readable medium according to claim 14, wherein the sequences of instruction include instructions that will further cause the at least one processor of the address assignment device to:
  respectively requesting an identifier from each target device of the plurality of target devices using the second dynamic address selected by the target device; and
  responsive to receiving no identifiers, discontinuing assigning addresses.

20. A system for assigning addresses to a plurality of target devices within a network, the system comprising:
  an address assignment device configured to:
    issue a first instruction to each target device of the plurality of target devices, the first instruction requesting that each target device of the plurality of target devices respectively select a first dynamic address from a first set of dynamic addresses, the first instruction including an indication of a first address of the first set of dynamic addresses and an indication of a last address of the first set of dynamic;
    receive at least one first response from any of a first subset of target devices of the plurality of target devices having a first dynamic address that uniquely identifies the target device; and
    respectively issue a first assignment of a first different static address to each target device of the first subset of target devices, wherein each of the plurality of target devices is configured to:
      receive the first instruction from the address assignment device;
      select the first dynamic address responsive to receiving of the first instruction;
      issue, to the address assignment device, a first response to the first instruction;
      receive, from the address assignment device, the first assignment of the first different static address; and
      store the first different static address as a communications address.

21. The system according to claim 20, wherein the address assignment device is further configured to:
  issue a second instruction to each target device of the plurality of target devices, the second instruction requesting that each target device of the plurality of target devices not belonging to the first subset of target devices respectively select a second dynamic address from a second set of dynamic addresses;
  receive at least one second response from any of a second subset of target devices of the plurality of target devices, each target device of the second subset of target devices having a second dynamic address that uniquely identifies the target device; and
  respectively issue a second assignment of a second different static address to each target device of the second subset of target devices,
  wherein each target device of the plurality of target devices is further configured to:
    receive the second instruction from the address assignment device;
    select the second dynamic address responsive to receiving of the second instruction;
    issue, to the address assignment device, a second response to the second instruction;
    receive, from the first address assignment device, the second assignment of the second different static address; and
    store the second different static address as a communications address.

22. The system according to claim 20, wherein each target device of the plurality of target devices is configured to randomly select the first dynamic address.

23. The system according to claim 20, wherein each target device of the plurality of target devices is configured to respond to the first instruction with a unique identifier.

24. The system according to claim 23, wherein the unique identifier is based on at least one of a serial number, a microprocessor identifier, a number generated from a random number generator and a number generated from a true random number generator.

* * * * *